US009005559B2

(12) United States Patent
Sumiya et al.

(10) Patent No.: US 9,005,559 B2
(45) Date of Patent: Apr. 14, 2015

(54) OXIDATION CATALYST FOR INTERNAL COMBUSTION ENGINE EXHAUST GAS TREATMENT

(71) Applicants: Johnson Matthey Japan G.K., Sakura-shi Tochigi (JP); Johnson Matthey Public Limited Company, London (GB)

(72) Inventors: Satoshi Sumiya, Sakura (JP); Lifeng Wang, Sakura (JP); Hanako Oyamada, Sakura (JP); Philip Gerald Blakeman, Philadelphia, PA (US); Gavin Michael Brown, Essex (GB); Sougato Chatterjee, Wayne, PA (US); Andrew Francis Chiffey, Ware (GB); Jane Gast, Spring City, PA (US); Paul Richard Phillips, Royston (GB); Raj Rao Rajaram, Slough (GB); Andrew Peter Walker, High Wycombe (GB)

(73) Assignees: Johnson Matthey Public Limited Company, London (GB); Johnson Matthey Japan Godo Kaisha, Sakura-Shi Tochigi (JP)

( * ) Notice: Subject to any disclaimer, the term of this patent is extended or adjusted under 35 U.S.C. 154(b) by 0 days.

(21) Appl. No.: 14/158,889

(22) Filed: Jan. 20, 2014

(65) Prior Publication Data

US 2014/0130760 A1   May 15, 2014

Related U.S. Application Data

(63) Continuation of application No. 13/645,891, filed on Oct. 5, 2012, now Pat. No. 8,652,429.

(60) Provisional application No. 61/569,542, filed on Dec. 12, 2011, provisional application No. 61/623,736, filed on Apr. 13, 2012.

(30) Foreign Application Priority Data

Oct. 6, 2011  (JP) .................................. 2011-221896
Jan. 18, 2012  (GB) .................................. 1200786.0

(51) Int. Cl.
B01D 53/94       (2006.01)
B01J 23/40       (2006.01)
(Continued)

(52) U.S. Cl.
CPC ........... *F01N 3/2803* (2013.01); *B01J 37/0244* (2013.01); *B01J 37/0246* (2013.01);
(Continued)

(58) Field of Classification Search
USPC .................. 502/325, 339, 527.12; 423/213.5; 60/274, 299
See application file for complete search history.

(56) References Cited

U.S. PATENT DOCUMENTS 5,473,887 A    12/1995  Takeshima et al.
6,080,375 A     6/2000  Mussmann et al.
(Continued)

FOREIGN PATENT DOCUMENTS

EP    0341832 A2    11/1989
EP    0622107 A2    11/1994
(Continued)

OTHER PUBLICATIONS

Cavataio, G. et al., "Impact and Prevention of Ultra-Low Contamination of Platinum Group Metals on SCR Catalysts Due to Doc Design," 2009, SAE Technical Paper 2009-01-0627.
(Continued)

*Primary Examiner* — Timothy Vanoy
(74) *Attorney, Agent, or Firm* — Kevin M. Carroll

(57) ABSTRACT

The invention provides an exhaust gas cleaning oxidation catalyst and in particular to an oxidation catalyst for cleaning the exhaust gas discharged from internal combustion engines of compression ignition type (particularly diesel engines). The invention further relates to a catalysed substrate monolith comprising an oxidising catalyst on a substrate monolith for use in treating exhaust gas emitted from a lean-burn internal combustion engine. In particular, the invention relates to a catalysed substrate monolith comprising a first washcoat coating and a second washcoat coating, wherein the second washcoat coating is disposed in a layer above the first washcoat coating.

21 Claims, 5 Drawing Sheets

(51) Int. Cl.

| | |
|---|---|
| *B01J 23/42* | (2006.01) |
| *B01J 23/44* | (2006.01) |
| *F01N 3/28* | (2006.01) |
| *B01J 37/02* | (2006.01) |
| *B01J 29/068* | (2006.01) |
| *B01J 37/03* | (2006.01) |
| *B01J 35/00* | (2006.01) |
| *B01J 29/06* | (2006.01) |
| *B01J 29/74* | (2006.01) |
| *B01J 29/76* | (2006.01) |
| *B01J 35/04* | (2006.01) |
| *B01J 20/18* | (2006.01) |
| *F01N 3/20* | (2006.01) |

(52) U.S. Cl.
 CPC .............. *B01J 23/42* (2013.01); *B01J 23/44* (2013.01); *B01D 53/944* (2013.01); *B01J 29/068* (2013.01); *B01J 37/038* (2013.01); *B01J 35/0006* (2013.01); *B01J 29/06* (2013.01); *B01J 29/7415* (2013.01); *B01J 29/7615* (2013.01); *B01J 29/763* (2013.01); *B01J 35/04* (2013.01); *B01J 2229/186* (2013.01); *B01J 20/18* (2013.01); *F01N 3/208* (2013.01); *Y10S 502/52712* (2013.01)

(56) References Cited

U.S. PATENT DOCUMENTS

| | | | |
|---|---|---|---|
| 6,093,378 A | 7/2000 | Deeba et al. ............... 423/213.5 |
| 6,348,430 B1 | 2/2002 | Lindner et al. | |
| 6,835,689 B1 | 12/2004 | He et al. | |
| 7,550,124 B2 | 6/2009 | Chen et al. | |
| 7,576,031 B2 | 8/2009 | Beutel et al. | |
| 7,758,834 B2 | 7/2010 | Chen et al. | |
| 7,875,573 B2 | 1/2011 | Beutel et al. ................. 502/339 |
| 8,252,258 B2 | 8/2012 | Muller-Stach et al. ..... 423/213.2 |
| 8,318,632 B2 | 11/2012 | Matsueda et al. ............ 502/328 |
| 8,415,269 B2 | 4/2013 | Hao et al. | |
| 8,617,497 B2 | 12/2013 | Adelmann et al. | |
| 8,652,429 B2 * | 2/2014 | Sumiya et al. ............. 423/213.2 |
| 2001/0053340 A1 | 12/2001 | Noda et al. ................. 423/213.2 |
| 2004/0209769 A1 | 10/2004 | Demel et al. | |
| 2006/0057046 A1 | 3/2006 | Punke et al. | |
| 2007/0157607 A1 | 7/2007 | Pfefferle | |
| 2008/0045405 A1 | 2/2008 | Beutel et al. | |
| 2008/0125308 A1 | 5/2008 | Fujdala et al. | |
| 2009/0196812 A1 | 8/2009 | Bull et al. | |
| 2009/0260349 A1 | 10/2009 | Gandhi et al. | |
| 2009/0285737 A1 | 11/2009 | Bull et al. | |
| 2010/0016150 A1 | 1/2010 | Yabuzaki et al. | |
| 2010/0166629 A1 | 7/2010 | Deeba | |
| 2010/0175372 A1 | 7/2010 | Lambert et al. | |
| 2010/0180581 A1 | 7/2010 | Grubert et al. | |
| 2010/0183490 A1 | 7/2010 | Hoke et al. | |
| 2010/0215557 A1 | 8/2010 | Liu et al. | |
| 2010/0221154 A1 | 9/2010 | Lee et al. | |
| 2010/0263357 A1 | 10/2010 | Lindner et al. | |
| 2010/0290964 A1 | 11/2010 | Southward et al. | |
| 2011/0014099 A1 | 1/2011 | Dornhaus et al. | |
| 2011/0064632 A1 | 3/2011 | Huang et al. | |
| 2011/0064633 A1 | 3/2011 | Huang et al. | |
| 2011/0099975 A1 | 5/2011 | Bailey et al. | |
| 2011/0138777 A1 | 6/2011 | Jen et al. | |
| 2011/0143921 A1 | 6/2011 | Hao et al. | |
| 2011/0173950 A1 | 7/2011 | Wan et al. | |
| 2011/0206584 A1 * | 8/2011 | Dobson et al. ............. 423/213.5 |
| 2011/0286900 A1 | 11/2011 | Caudle et al. | |
| 2012/0128558 A1 | 5/2012 | Nunan et al. | |
| 2013/0084222 A1 | 4/2013 | Grubert et al. | |
| 2013/0149207 A1 | 6/2013 | Castagnola et al. | |
| 2013/0149221 A1 | 6/2013 | Blakeman et al. | |
| 2013/0149222 A1 | 6/2013 | Blakeman et al. | |
| 2013/0149223 A1 | 6/2013 | Blakeman et al. | |

FOREIGN PATENT DOCUMENTS

| | | |
|---|---|---|
| EP | 0766993 A2 | 4/1997 |
| EP | 0830201 B1 | 1/2000 |
| EP | 1925362 A1 | 5/2008 |
| EP | 2275194 A1 | 1/2011 |
| EP | 2520354 A1 | 11/2012 |
| EP | 2535102 A1 | 12/2012 |
| EP | 2692436 A1 | 2/2014 |
| GB | 2375059 A | 11/2002 |
| GB | 2406803 A | 4/2005 |
| JP | 6206844 A | 3/1987 |
| JP | 4022707 | 1/1992 |
| JP | 09-271674 | 10/1997 |
| JP | 2006-272064 | 10/2006 |
| JP | 2007-229679 | 9/2007 |
| JP | 2008-279352 | 11/2008 |
| WO | 9947260 A1 | 9/1999 |
| WO | 0059630 A1 | 10/2000 |
| WO | 2005016497 A1 | 2/2005 |
| WO | 2008132452 A2 | 11/2008 |
| WO | 2009093071 A1 | 7/2009 |
| WO | 2009136206 A1 | 11/2009 |
| WO | 2010075345 A2 | 7/2010 |
| WO | 2010133309 A1 | 11/2010 |
| WO | 2011080525 A1 | 7/2011 |
| WO | 2011082357 A2 | 7/2011 |
| WO | 9947260 A1 | 8/2011 |
| WO | 2011092521 A1 | 8/2011 |
| WO | 2011131324 A1 | 10/2011 |
| WO | 2012133055 A1 | 10/2012 |
| WO | 2012146883 A1 | 11/2012 |
| WO | 2012147376 A1 | 11/2012 |
| WO | 2012160391 A1 | 11/2012 |
| WO | 2012175948 A1 | 12/2012 |
| WO | 2013042080 A1 | 3/2013 |

OTHER PUBLICATIONS

Jen, H-W. et al., "Detection, Origin and Effect of Ultra-Low Platinum Contamination on Diesel-SCR Catalysts," Powertrains, Fuels & Lubricants Meeting, Rosemont, Illinois, Oct. 6-9, 2008, SAE Technical Paper 2008-01-2488.
GB Search Report dated May 16, 2012 for corresponding Application No. 1217884.4 filed Oct. 5, 2012.
PCT International Search Report dated Apr. 2, 2013 for corresponding International Application No. PCT/GB2012/052482 filed Oct. 5, 2012.
GB Search Report dated Mar. 14, 2012 for corresponding GB Application No. GB1200780.3 filed Jan. 18, 2012.
GB Search Report dated Jan. 15, 2013 for corresponding GB Application No. GB1222280.8 filed Dec. 11, 2012.
International Search Report dated Jun. 4, 2013 for corresponding PCT Inteational Patent Application No. PCT/GB2012/053090 filed Dec. 11, 2012.
GB Search Report dated May 16, 2012 for corresponding GB Application No. GB1200781.1 filed Jan. 18, 2012.
International Search Report dated Mar. 25, 2013 for corresponding PCT International Patent Application No. PCT/GB2012/053089 filed Dec. 11, 2012.
GB Search Report dated May 16, 2012 for corresponding Application No. GB1200784.5 filed Jan. 18, 2012.
PCT International Search Report dated Mar. 6, 2013 for corresponding International Application No. PCT/GB2012/053081 filed Dec. 11, 2012.

* cited by examiner

OXIDATION CATALYST FOR INTERNAL COMBUSTION ENGINE EXHAUST GAS TREATMENT

This is a continuation of application. Ser. No. 13/645,891, filed Oct. 5, 2012, issued as U.S. Pat. No. 8,652,429, which claims priority to U.S. Provisional Application No. 61/569,542, filed on Dec. 12, 2011, U.S. Provisional Application No. 61/623,736, filed on Apr. 13, 2012, Japanese Application No. 2011-221896, filed Oct. 6, 2011, and United Kingdom Application No. 1200786.0, filed Jan. 18, 2012. The entire teachings of the above applications are incorporated herein by reference.

FIELD OF THE INVENTION

The invention relates to an exhaust gas cleaning oxidation catalyst and in particular to an oxidation catalyst for cleaning the exhaust gas discharged from internal combustion engines of compression ignition type (particularly diesel engines). The invention further relates to a catalysed substrate monolith comprising an oxidising catalyst on a substrate monolith for use in treating exhaust gas emitted from a lean-burn internal combustion engine. In particular, the invention relates to a catalysed substrate monolith comprising a first washcoat coating and a second washcoat coating, wherein the second washcoat coating is disposed in a layer above the first washcoat coating. The invention also relates to the use of such catalysed substrate monoliths in exhausts systems of lean-burn internal combustion engines, particularly vehicular lean-burn internal combustion engines.

BACKGROUND TO THE INVENTION

Generally, there are four classes of pollutant that are legislated against by inter-governmental organisations throughout the world: carbon monoxide (CO), unburned hydrocarbons (HC), oxides of nitrogen ($NO_x$) and particulate matter (PM).

Oxidation catalysts have been used to clean up the hydrocarbon (HC), carbon monoxide (CO) and also the soluble organic fraction (SOF), in the exhaust gas produced by fuel combustion in internal combustion engines of the compression ignition type (see Japan Patent Kokai No. 9-271674). Recently attention has also focused on treatment of the particulate matter (PM) produced by fuel combustion in internal combustion engines of the compression ignition type, and filters that can collect PM (diesel particulate filters (DPF). An oxidation catalyst has been placed in the upstream part of the DPF with the aim of improving the efficiency of treatment of PM in the DPF (see Japan Patent Kokai No. 2006-272064).

Heavier fuels contain a greater sulphur fraction. In compression type internal combustion engines that use diesel oil as fuel, oxides of sulphur ($SO_x$) are evolved in the fuel combustion and catalytic process, and the activity of the oxidation catalyst has been depressed by the presence of $SO_x$ (sulphur poisoning). To counter this problem, oxidation catalysts having resistance to sulphur poisoning have been proposed, which have zeolite as a mixture containing specific proportions by weight of ZSM-5 and β-zeolite (see Japan Patent Kokai No. 2007-229679). In addition, to make the cleaning of exhaust gas more efficient, an $NO_x$ cleaning catalyst having a double layer structure has been proposed that comprises two different catalyst layers, namely an $NO_x$ oxidation catalyst layer and $NO_x$ selective reduction catalyst layer (see Japan Patent Kokai 2008-279352).

As emissions standards for permissible emission of pollutants in exhaust gases from vehicular engines become progressively tightened, a combination of engine management and multiple catalyst exhaust gas after-treatment systems are being proposed and developed to meet these emission standards. For exhaust systems containing a particulate filter, it is common for engine management to be used periodically (e.g. every 500 km) to increase the temperature in the filter in order to combust substantially all remaining soot held on the filter thereby to return the system to a base-line level. These engine managed soot combustion events are often called "filter regeneration". While a primary focus of filter regeneration is to combust soot held on the filter, an unintended consequence is that one or more catalyst coatings present in the exhaust system, e.g. a filter coating on the filter itself (a so-called catalysed soot filter (CSF)), an oxidation catalyst (such as a diesel oxidation catalyst (DOC)) or a $NO_x$ adsorber catalyst (NAC) located upstream or downstream of the filter (e.g. a first DOC followed by a diesel particulate filter, followed in turn by a second DOC and finally a SCR catalyst), can be regularly exposed to high exhaust gas temperatures, depending on the level of engine management control in the system. Such conditions may also be experienced with unintended occasional engine upset modes or uncontrolled or poorly controlled regeneration events. However, some diesel engines, particularly heavy duty diesel engines operating at high load, may even expose catalysts to significant temperatures, e.g. >600° C. under normal operating conditions.

As vehicle manufacturers develop their engines and engine management systems for meeting the emission standards, the Applicant/Assignee is being asked by the vehicle manufacturers to propose catalytic components and combinations of catalytic components to assist in the goal of meeting the emission standards. Such components include DOCs for oxidising CO, HCs and optionally NO also; CSFs for oxidising CO, HCs, optionally for oxidising NO also, and for trapping particulate matter for subsequent combustion; NACs for oxidising CO and HC and for oxidising nitrogen monoxide (NO) and absorbing it from a lean exhaust gas and to desorb adsorbed $NO_x$ and for reducing it to $N_2$ in a rich exhaust gas (see below); and selective catalytic reduction (SCR) catalysts for reducing $NO_x$ to $N_2$ in the presence of a nitrogenous reductant, such as ammonia (see below).

In practice, catalyst compositions employed in DOCs and CSFs are quite similar. Generally, however, a principle difference between the use of a DOC and a CSF is the substrate monolith onto which the catalyst composition is coated: in the case of a DOC, the substrate monolith is typically a flow-through substrate monolith, comprising a metal or ceramic honeycomb monolith having an array of elongate channels extending therethrough, which channels are open at both ends; a CSF substrate monolith is a filtering monolith such as a wall-flow filter, e.g. a ceramic porous filter substrate comprising a plurality of inlet channels arranged in parallel with a plurality of outlet channels, wherein each inlet channel and each outlet channel is defined in part by a ceramic wall of porous structure, wherein each inlet channel is alternately separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

Quite complicated multiple layered catalyst arrangements such as DOCs and NACs can be coated on a flow-through substrate monolith. Although it is possible to coat a surface of a filter monolith, e.g. an inlet channel surface of a wall-flow filter, with more than one layer of catalyst composition, an issue with coating filtering monoliths is to avoid unnecessarily increasing back-pressure, when in use, by overloading the filter monolith with catalyst washcoat, thereby restricting the passage of gas therethrough. Hence, although coating a surface of a filter substrate monolith sequentially with one or more different catalyst layers is not impossible, it is more common for different catalyst compositions to be segregated either in zones, e.g. axially segregated front and rear half zones of a filter monolith, or else by coating an inlet channel of a wall-flow filter substrate monolith with a first catalyst composition and an outlet channel thereof with a second catalyst composition. However, in particular embodiments of the present invention, the filter inlet is coated with one or more layers, which layers may be the same or a different catalyst composition. It has also been proposed to coat a NAC composition on a filtering substrate monolith (see e.g. EP 0766993).

In exhaust systems comprising multiple catalyst components, each comprising a separate substrate monolith, typically, the SCR catalyst is located downstream of a DOC and/or a CSF and/or a NAC because it is known that by oxidising some nitrogen oxide (NO) in the exhaust gas to nitrogen dioxide ($NO_2$) so that there is about a 1:1 ratio of $NO:NO_2$ exiting the DOC and/or the CSF and/or the NAC, the downstream SCR reaction is promoted (see below). It is also well known from EP341832 (the so-called Continuously Regenerating Trap or CRT®) that $NO_2$, generated by oxidising NO in exhaust gas to $NO_2$, can be used to combust soot passively on a downstream filter. In exhaust system arrangements where the process of EP341832 is important, were the SCR catalyst to be located upstream of the filter, this would reduce or prevent the process of combusting trapped soot in $NO_2$, because a majority of the $NO_x$ used for combusting the soot would likely be removed on the SCR catalyst.

However, a preferred system arrangement for light-duty diesel vehicles is a diesel oxidation catalyst (DOC) followed by a nitrogenous reductant injector, then a SCR catalyst and finally a catalysed soot filter (CSF). A short hand for such an arrangement is "DOC/SCR/CSF". This arrangement is preferred for light-duty diesel vehicles because an important consideration is to achieve $NO_x$ conversion in an exhaust system as quickly as is possible after a vehicle engine is started to enable (i) precursors of nitrogenous reductants such as ammonia to be injected/decomposed in order to liberate ammonia for $NO_x$ conversion; and (ii) as high $NO_x$ conversion as possible. Were a large thermal mass filter to be placed upstream of the SCR catalyst, i.e. between the DOC and the SCR catalyst ("DOC/CSF/SCR"), the processes of (i) and (ii) would take far longer to achieve and $NO_x$ conversion as a whole of the emission standard drive cycle could be reduced. Particulate removal can be done using oxygen and occasional forced regeneration of the filter using engine management techniques.

It has also been proposed to coat a SCR catalyst washcoat on a filter substrate monolith itself (see e.g. WO 2005/016497), in which case an oxidation catalyst may be located upstream of the SCR-coated filter substrate (whether the oxidation catalyst is a component of a DOC, a CSF or a NAC) in order to modify the $NO/NO_2$ ratio for promoting $NO_x$ reduction activity on the SCR catalyst. There have also been proposals to locate a NAC upstream of a SCR catalyst disposed on a flow-through substrate monolith, which NAC can generate $NH_3$ in situ during regeneration of the NAC (see below). One such proposal is disclosed in GB 2375059.

NACs are known e.g. from U.S. Pat. No. 5,473,887 and are designed to adsorb NO from lean exhaust gas (lambda >1) and to desorb the NO when the oxygen concentration in the exhaust gas is decreased. Desorbed NO may be reduced to $N_2$ with a suitable reductant, e.g. engine fuel, promoted by a catalyst component, such as rhodium, of the NAC itself or located downstream of the NAC. In practice, control of oxygen concentration can be adjusted to a desired redox composition intermittently in response to a calculated remaining NO adsorption capacity of the NAC, e.g. richer than normal engine running operation (but still lean of stoichiometric or lambda=1 composition), stoichiometric or rich of stoichiometric (lambda <1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity (i.e. substantially more than is required for use as a promoter such as a promoter in a three-way catalyst) of a $NO_x$-storage component, such as barium, and a reduction catalyst, e.g. rhodium. One mechanism commonly given for $NO_x$-storage from a lean exhaust gas for this formulation is:

$$NO + \tfrac{1}{2}O_2 \rightarrow NO_2 \quad (1); \text{ and}$$

$$BaO + 2NO_2 + \tfrac{1}{2}O_2 \rightarrow Ba(NO_3)_2 \quad (2),$$

wherein in reaction (1), the nitric oxide reacts with oxygen on active oxidation sites on the platinum to form $NO_2$. Reaction (2) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

$$Ba(NO_3)_2 \rightarrow BaO + 2NO + 3/2 O_2 \text{ or } Ba(NO_3)_2 \rightarrow BaO + 2NO_2 + \tfrac{1}{2}O_2 \quad (3); \text{ and}$$

$$NO + CO \rightarrow \tfrac{1}{2}N_2 + CO_2 \quad (4);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (1)-(4) inclusive herein above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

Oxidation catalysts promote the oxidation of CO to $CO_2$ and unburned HCs to $CO_2$ and $H_2O$. Typical oxidation catalysts include platinum and/or palladium on a high surface area support.

The application of SCR technology to treat $NO_x$ emissions from vehicular internal combustion (IC) engines, particularly lean-burn IC engines, is well known. Examples of nitrogenous reductants that may be used in the SCR reaction include compounds such as nitrogen hydrides, e.g. ammonia ($NH_3$) or hydrazine, or an $NH_3$ precursor.

$NH_3$ precursors are one or more compounds from which $NH_3$ can be derived, e.g. by hydrolysis. Decomposition of the precursor to ammonia and other by-products can be by hydrothermal or catalytic hydrolysis. $NH_3$ precursors include urea ($CO(NH_2)_2$) as an aqueous solution or as a solid or ammonium carbamate ($NH_2COONH_4$). If the urea is used as an aqueous solution, a eutectic mixture, e.g. a 32.5% $NH_3$ (aq), is preferred. Additives can be included in the aqueous solutions to reduce the crystallisation temperature. Presently, urea is the preferred source of $NH_3$ for mobile applications because it is less toxic than $NH_3$, it is easy to transport and handle, is inexpensive and commonly available. Incomplete hydrolysis of urea can lead to increased PM emissions on tests for meeting the relevant emission test cycle because partially hydrolysed urea solids or droplets will be trapped by the filter paper used in the legislative test for PM and counted as PM mass. Furthermore, the release of certain products of incomplete urea hydrolysis, such as cyanuric acid, is environmentally undesirable.

SCR has three main reactions (represented below in reactions (5)-(7) inclusive) which reduce $NO_x$ to elemental nitrogen.

$$4NH_3 + 4NO + O_2 \rightarrow 4N_2 + 6H_2O \text{ (i.e. 1:1 } NH_3\text{:NO)} \quad (5)$$

$$4NH_3 + 2NO + 2NO_2 \rightarrow 4N_2 + 6H_2O \text{ (i.e. 1:1 } NH_3\text{:}NO_x\text{)} \quad (6)$$

$$8NH_3 + 6NO_2 \rightarrow 7N_2 + 12H_2O \text{ (i.e. 4:3 } NH_3\text{:}NO_x\text{)} \quad (7)$$

A relevant undesirable, non-selective side-reaction is:

$$2NH_3 + 2NO_2 \rightarrow N_2O + 3H_2O + N_2 \quad (8)$$

In practice, reaction (7) is relatively slow compared with reaction (5) and reaction (6) is quickest of all. For this reason, when skilled technologists design exhaust aftertreatment systems for vehicles, they often prefer to dispose an oxidation catalyst element (e.g. a DOC and/or a CSF and/or a NAC) upstream of an SCR catalyst.

It has been brought to the Applicant/Assignee's attention by its customers that when certain DOCs and/or NACs and/or CSFs become exposed to the high temperatures encountered e.g. during filter regeneration and/or an engine upset event and/or (in certain heavy-duty diesel applications) normal high temperature exhaust gas, it is possible given sufficient time at high temperature for low levels of platinum group metal components, particularly Pt, to volatilise from the DOC and/or the NAC and/or the CSF components and subsequently for the platinum group metal to become trapped on a downstream SCR catalyst. This can have a highly detrimental effect on the performance of the SCR catalyst, since the presence of Pt leads to a high activity for competing, non-selective ammonia oxidation such as in reaction (9) (which shows the complete oxidation of $NH_3$), thereby producing secondary emissions and/or unproductively consuming $NH_3$.

$$4NH_3 + 5O_2 \rightarrow 4NO + 6H_2O \quad (9)$$

One vehicle manufacturer has reported the observation of this phenomenon in SAE paper 2009-01-0627, which is entitled "Impact and Prevention of Ultra-Low Contamination of Platinum Group Metals on SCR catalysts Due to DOC Design" and includes data comparing the $NO_x$ conversion activity against temperature for a Fe/zeolite SCR catalyst located in series behind four suppliers' platinum group metal (PGM)-containing DOCs that were contacted with a flowing model exhaust gas at 850° C. for 16 hours. The results presented show that the $NO_x$ conversion activity of a Fe/zeolite SCR catalyst disposed behind a 20Pt:Pd DOC at 70 gft$^{-3}$ total PGM was negatively altered at higher evaluation temperatures as compared to lower evaluation temperatures as a result of Pt contamination. Two 2Pt:Pd DOCs from different suppliers at 105 gft$^{-3}$ total PGM were also tested. In a first 2Pt:Pd DOC, the SCR catalyst activity was affected to a similar extent as the test on the 20Pt:Pd DOC, whereas for the second 2Pt:Pd DOC tested the SCR catalyst activity was contaminated to a lesser extent, although the second 2Pt:Pd DOC still showed reduced $NO_x$ conversion activity compared with the blank control (no DOC, just a bare substrate). The authors concluded that the supplier of the second 2Pt:Pd DOC, which showed more moderate $NO_x$ conversion degradation, was more successful in stabilising the 70 gft$^{-3}$ Pt present with the 35 gft$^{-3}$ Pd. A Pd-only DOC at 150 gft$^{-3}$ demonstrated no impact on the downstream SCR relative to the blank control. Earlier work from the authors of SAE 2009-01-0627 was published in SAE paper no. 2008-01-2488.

Vehicle manufacturers have begun asking the Applicant/Assignee for measures to solve the problem of volatilisation of relatively low levels PGMs from components upstream of SCR catalysts. It would be highly desirable to develop strategies to prevent this PGM movement onto a downstream SCR catalyst at high temperatures. The present inventors have developed a number of strategies for meeting this need.

U.S. Pat. No. 7,576,031 discloses a Pt—Pd diesel oxidation catalyst with CO/HC light-off and HC storage function. In particular, the diesel oxidation catalyst comprises a washcoat composition comprising two distinct washcoat layers. A first (or top) washcoat layer comprises a high-surface area support material, one or more hydrocarbon storage components, and a precious metal catalyst containing platinum (Pt) and palladium (Pd). The second (or bottom) washcoat layer comprises a high-surface area support material and a precious metal catalyst containing platinum (Pt) and palladium (Pd), wherein the support is a substantially silica free support material and does not contain a hydrocarbon storage component.

The two layers of the diesel oxidation catalyst disclosed in U.S. Pat. No. 7,576,031 have two distinctly different weight ratios of Pt:Pd relative to one another, wherein the Pt:Pd weight ratio in a first layer (the first or top washcoat layer) is greater than the Pt:Pd weight ratio of a second layer (the second or bottom washcoat layer). For example, the first or top washcoat layer may contain a Pt:Pd weight ratio of at least 2:1. Pt:Pd weight ratios from at least about 2:1 to about 10:1, from about 3:1 to about 5:1, or from about 3:1 to about 4:1, are also exemplified. It is explained that it is important to use a high amount of Pt in the first or top washcoat layer in order to boost sulfur tolerance while maintaining some stabilization of the metal phase against sintering. The first or top washcoat layer contains a hydrocarbon (HC) storage component, e.g., a zeolite, in order to store HCs during the cold start period of the drive cycle. After warm-up of the catalyst, the hydrocarbon (HC) storage component will release the stored HCs which are subsequently converted over the catalyst. It is important, the description continues, that the hydrocarbon (HC) storage component (e.g., zeolite) be incorporated into the layer with the higher Pt:Pd weight ratio in order to ensure an efficient conversion of released paraffins.

The second or bottom layer of the diesel oxidation catalyst disclosed in U.S. Pat. No. 7,576,031 contains a lower Pt:Pd weight ratio to replace a maximum of the Pt with Pd for maximum cost saving reasons. The second or bottom washcoat layer has a Pt:Pd weight ratio of less than about 2:1. Also, exemplified are Pt:Pd ratios of from less than about 2:1 to about 1:2, or from less than about 2:1 to about 1.4:1 (7:5). However, a minimum ratio of 1.4:1 (7:5) is preferred in order to guarantee sufficient CO/olefin light-off activity after thermal aging.

SUMMARY OF THE INVENTION

Accordingly, the development of an oxidation catalyst for an internal combustion engine, particularly a compression ignition internal combustion engine, whereby SOF, HC and CO can be continuously and effectively cleaned up, and preferably also where sulphur poisoning can be largely avoided, has now become a matter of urgency. In recent years, a need has arisen to develop catalysts that reduce the amount of expensive and scarce noble metals hitherto used while having the same processing capability as existing exhaust gas cleaning catalysts.

The inventors have surprisingly found that differences in the amount of noble group metal and hydrocarbon adsorbent present (the loading) in the catalyst layer can produce advantageous catalyst activity, particularly for the treatment of HC and CO (particularly CO) in an exhaust gas by converting them to water and carbon dioxide.

In a first aspect, the invention provides an oxidation catalyst for the oxidative treatment of a hydrocarbon (HC) and carbon monoxide (CO) in an exhaust gas, the oxidation catalyst comprising a supporting substrate and a plurality of catalyst layers supported on the supporting substrate, wherein the plurality of catalyst layers comprise a washcoat material, an active metal and a hydrocarbon adsorbent, and wherein one catalyst layer lies on the catalyst surface layer side and one or more other catalyst layers lie on the side lower than the said one catalyst layer; and wherein:
(a) the amount of hydrocarbon adsorbent in the said one catalyst layer is greater than the amount of hydrocarbon adsorbent in the said one or more other catalyst layers, and the concentration of active metal in the said one catalyst layer is the same as or less than the concentration of active metal in the said one or more other catalyst layers; or
(b) the amount of hydrocarbon adsorbent in the said one catalyst layer is the same as the amount of hydrocarbon adsorbent in the said one or more other catalyst layers, and the concentration of active metal in the said one catalyst layer is less than the concentration of active metal in the said one or more other catalyst layers.

By utilising the hydrocarbon (HC) adsorption and storage function, the oxidation catalyst of the invention can efficiently process carbon monoxide (CO), even at relatively low temperatures. When the exhaust temperature rises, the stored hydrocarbon (HC) is released and becomes amenable to oxidative treatment with the catalyst because of the high temperature. The advantageous exhaust gas cleaning capability of the catalyst of the invention is associated with the distribution of the hydrocarbon adsorbent and active metal between the layers. It is believed that by conferring an HC adsorption and storage function on the "one catalyst layer" of the surface layer on the exhaust gas catalyst side, the blocking effect on CO oxidation reaction in the "other catalyst layer" on the catalyst surface layer side close to the substrate support is inhibited, and when the concentration of noble metal in the "one catalyst layer" on the catalyst surface layer side is low, formation of CO due to partial oxidation of the hydrocarbon is inhibited when the adsorbed and stored hydrocarbon is released.

Typically, the oxidative catalyst in the first aspect of the invention is a catalysed substrate monolith and the supporting substrate is a substrate monolith. The one catalyst layer may be a first washcoat coating as defined herein and one of the other catalyst layers may be a second washcoat coating as defined herein.

Thus, the first aspect of the invention further relates to a catalysed substrate monolith for the oxidative treatment of a hydrocarbon (HC) and carbon monoxide (CO) in an exhaust gas, which catalysed substrate monolith comprises a substrate monolith, a first washcoat coating and a second washcoat coating, wherein the second washcoat coating is disposed in a layer above the first washcoat coating, wherein the first washcoat coating comprises a catalyst composition comprising an active metal and at least one support material for the active metal, and the second washcoat coating comprises a hydrocarbon adsorbent, and wherein:
(a) the amount of hydrocarbon adsorbent in the second washcoat coating is greater than the amount of hydrocarbon adsorbent in the first washcoat coating, and the concentration of active metal in the second washcoat coating is the same as or less than the concentration of active metal in the first washcoat coating; or
(b) the amount of hydrocarbon adsorbent in the second washcoat coating is the same as the amount of hydrocarbon adsorbent in the first washcoat coating, and the concentration of active metal in the second washcoat coating is less than the concentration of active metal in the first washcoat coating.

The inventors have also found that volatilisation of platinum from a PGM-containing catalyst comprising both platinum and palladium can occur under extreme temperature conditions when the weight ratio of Pt:Pd is or greater than about 2:1. It is also believed that where the PGM (platinum group metal) consists of platinum, platinum volatilisation may also be observed. The present inventors have devised layered PGM catalyst composition for use in combination with a downstream SCR catalyst which avoids or reduces the problem of PGM, particularly Pt, migrating from an upstream relatively highly loaded Pt catalyst to a downstream SCR catalyst.

A second aspect of the invention provides a catalysed substrate monolith comprising an oxidising catalyst on a substrate monolith for use in treating exhaust gas emitted from a lean-burn internal combustion engine, which catalysed substrate monolith comprises a first washcoat coating (typically having a length L) and a second washcoat coating, wherein the second washcoat coating is disposed in a layer above the first washcoat coating (typically for at least some of length L), wherein the first washcoat coating comprises a catalyst composition comprising platinum and at least one support material for the platinum, wherein the second washcoat coating comprises a catalyst composition comprising both platinum and palladium and at least one support material for the platinum and the palladium and wherein a weight ratio of platinum to palladium in the second washcoat coating is ≤2, such as 1.5:1 or about 1:1, e.g. ≤1:1. A significance of the latter feature is shown in some of the Examples: the inventors have found that the preferred Pt:Pd weight ratios volatilise less, by empiric testing, than a similar catalyst having a Pt:Pd weight ratio of 4:1.

A third aspect of the invention provides an exhaust system for a lean-burn internal combustion engine, which system comprising a first catalysed substrate monolith according to the invention, particularly the catalysed substrate monolith according to the second aspect of the invention.

A fourth aspect of the invention provides a lean-burn internal combustion engine, particularly for a vehicle, comprising an exhaust system according to the invention. The lean-burn internal combustion engine can be a positive ignition, e.g. a spark ignition, engine that typically run on gasoline fuel or blends of gasoline fuel and other components such as ethanol, but is preferably a compression ignition, e.g. a diesel-type engine. Lean-burn internal combustion engines include homogenous charge compression ignition (HCCI) engines, powered either by gasoline etc. fuel or diesel fuel.

A fifth aspect of the invention provides a method of reducing or preventing a selective catalytic reduction (SCR) catalyst in an exhaust system of a lean-burn internal combustion engine from becoming poisoned with platinum which may volatilise from a first washcoat coating (typically having a length L) comprising a catalyst composition comprising platinum and at least one support material for the platinum disposed on a substrate monolith upstream of the SCR catalyst when the catalyst composition comprising platinum is exposed to relatively extreme conditions including relatively high temperatures, which method comprising trapping volatilised platinum in a second washcoat coating disposed in a layer above the first washcoat coating (typically for at least some of the length L), which second washcoat coating comprising a catalyst composition comprising both platinum and palladium and at least one support material for the platinum and the palladium and wherein a weight ratio of platinum to palladium in the second washcoat coating is ≤2.

A sixth aspect of the invention provides an exhaust system for an internal combustion engine, particularly a compression ignition internal combustion engine, such as a diesel engine, which system comprises an oxidation catalyst or a catalysed substrate monolith according to the first aspect of the invention.

A seventh aspect of the invention provides an internal combustion engine, particularly for a vehicle, comprising an exhaust system according to the sixth aspect of the invention. The internal combustion engine can be a positive ignition, e.g. a spark ignition, engine that typically run on gasoline fuel or blends of gasoline fuel and other components such as ethanol, but is preferably a compression ignition, e.g. a diesel-type engine.

An eighth aspect the invention provides a vehicle comprising an engine according to the invention.

DETAILED DESCRIPTION OF THE INVENTION

Oxidation Catalyst and Catalysed Substrate Monolith

Figure 1:
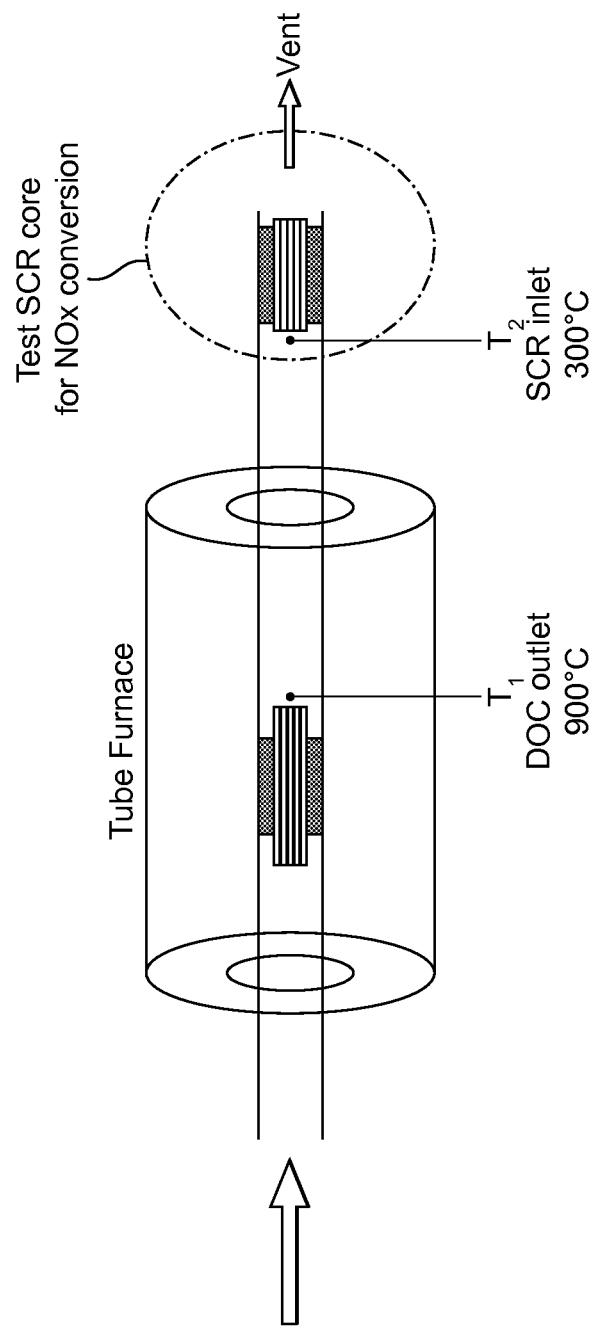
FIG. 1 is a schematic drawing of a laboratory reactor used for testing platinum contamination on a Cu/CHA zeolite SCR catalyst of Example 2 or an Fe/Beta zeolite SCR catalyst of Example 6.

Typically, each catalyst layer or washcoat coating has a mean thickness of from 25 to 200 μm, particularly 50 to 150 μm, and more particularly 75 to 125 μm (e.g. 100 μm). The thickness of the layers can be measured using an electron probe microanalyzer.

The mean thickness of each catalyst layer or washcoat coating may be the same or different. In one embodiment of the invention, the mean thickness of the one catalyst layer (e.g. second washcoat coating) and at least one of the other catalyst layers (e.g. first washcoat coating) is about the same.

The oxidation catalyst or catalysed substrate monolith of the invention comprises a plurality of catalyst layers or washcoat coatings. Typically, the oxidation catalyst or catalysed substrate monolith consists of 2, 3, 4 or 5 catalyst layers or washcoat coatings. It is preferred that the oxidation catalyst or catalysed substrate monolith consists of two catalyst layers or washcoat coatings. In the context of the first aspect of the invention, the "one catalyst layer" and the one or more "other catalyst layers" among the plurality of catalyst layers, the invention positions the "one catalyst layer" among the plurality of catalyst layers lie on the catalyst surface layer side and the "other catalyst layers" on the side lower than the "one catalyst layer" (on the supporting substrate side).

Generally, the component that adsorbs hydrocarbon (e.g. the hydrocarbon adsorbent or adsorber) has a high specific surface area for contact with the exhaust gas. Typically, the hydrocarbon adsorbent has a specific surface area of 50 to 1500 $m^2/g$, preferably 200 to 1000 $m^2/g$, and more preferably 200 to 900 $m^2/g$. The specific surface area is measured by the BET nitrogen adsorption method using nitrogen as the adsorbed-desorbed gas.

Typically, the hydrocarbon adsorbent is selected from zeolite, silica, alumina, titania, zirconia, magnesium oxide, calcium oxide, ceria, niobia, active charcoal, porous graphite and combinations of two or more thereof. Preferably, the hydrocarbon adsorbent is a zeolite. Examples of suitable zeolites include natural zeolites, such as analcime, chabazite, erionite, natrolite, mordenite, heulandite, stilbite and laumantite, and synthetic zeolites, such as zeolite type A, zeolite type Y, zeolite type X, zeolite type L, erionite, mordenite, beta zeolite and ZSM-5.

The ratio by amount of hydrocarbon adsorbent (i.e. hydrocarbon adsorber) in the said one catalyst layer or second washcoat coating to the said one or more other catalyst layers or first washcoat coating is, typically, 10:1 to 1.1:1, particularly 7.5:1 to 1.2:1, more particularly 5:1 to 1.3:1, even more particularly 4:1 to 1.4:1, still more particularly 3:1 to 1.5:1.

Typically, the one catalyst layer or second washcoat coating has a concentration of hydrocarbon adsorbent (i.e. hydrocarbon adsorbent) of 0.05 to 3.00 $gin^{-3}$, particularly 0.10 to 2.00 $gin^{-3}$, more particularly 0.25 to 0.75 $gin^{-3}$. The amount of hydrocarbon adsorbent present in a layer or overall is related to the trapping capacity of the oxidation catalyst or catalysed substrate monolith.

Characteristically the amount of hydrocarbon adsorbent present in "one catalyst layer" is greater than the amount of hydrocarbon adsorbent present in the "other catalyst layers" and the concentration of aforesaid active metal present in "one catalyst layer" is less than the concentration of the aforesaid active metal present in the "other catalyst layers";

also, the catalyst layers may be stacked with the "one catalyst layer" and the "other catalyst layers" adjacent, and may have an intermediate catalyst layer (or other layer, a layer of the same or different composition) interposed therebetween. Moreover, the invention selects any desired two catalyst layers in the plurality of catalyst layers and positions them such that "one catalyst layer" lies on the catalyst surface layer side and the "other catalyst layer" lies on the side lower than the aforesaid catalyst layer (the supporting substrate side); wherein, if "one catalyst layer" is defined, the other is automatically defined as the "other catalyst layer".

The one catalyst layer or second washcoat coating typically has a concentration of hydrocarbon adsorbent of 10 to 50% by weight of the layer or washcoat coating, particularly 15 to 40% by weight, more particularly 20 to 30% by weight.

The active metal serves as the catalytically active component of the oxidation catalyst or catalysed substrate monolith. The active metal is a noble metal, a base metal or a platinum group metal (PGM).

Examples of suitable noble metals include platinum, palladium, rhodium, ruthenium, iridium, osmium, gold and silver. When the active metal is a noble metal, then preferably the active metal is platinum, palladium or gold. The noble metals can be used singly or as a mixture of two or more, such as a mixture of platinum and palladium, or a mixture of platinum, palladium and gold.

Examples of base metals include nickel, copper, manganese, iron, cobalt and zinc. When the active metal is a base metal, then preferably the active metal is nickel, copper, manganese or iron. The base metals can also be used singly or as a mixture of two or more.

The active metal in the one catalyst layer or the second washcoat coating can be the same as or different to the active metal in the one or more other catalyst layers or first washcoat coating.

It is preferred that the active metal is a platinum group metal. More preferably, the active metal is platinum, palladium or a mixture thereof.

When an active metal is present in both the one catalyst layer or second washcoat coating and the one or more other catalyst layers or first washcoat coating, then active metal may be the same or different.

Typically, the ratio by concentration of active metal, such as platinum group metal (PGM), in the said one catalyst layer (or second washcoat coating) to the said one or more other catalyst layers (or first washcoat coating) is 1:50 to 1:1.1, particularly 1:35 to 1:1.2, more particularly 1:20 to 1:1.3, even more particularly 1:15 to 1:1.4, still more particularly 1:10 to 1:1.5 (e.g. 1:5 to 1:1.5).

Generally, the one or more other catalyst layers (or first washcoat coating) have a concentration of active metal, such as a PGM, of 0.05 to 3.5 $gin^{-3}$, particularly 0.1 to 1.5 $gin^{-3}$, more particularly 0.25 to 0.75 $gin^{-3}$ (e.g. 0.1 to 0.75 $gin^{-3}$). The amount of active metal present determines the number of active sites that are available for catalysis.

Typically, the one or more other catalyst layers (or first washcoat coating) have a concentration of active metal, such as a PGM, of 0.05 to 7.5% by weight, particularly 0.5 to 5% by weight, more particularly 1 to 3% by weight.

The one catalyst layer (or second washcoat coating) typically has a concentration of active, such as a PGM, of 0.01 to 5% by weight, particularly 0.05 to 0.5% by weight, more particularly 0.1 to 0.3% by weight.

In one embodiment of the invention, there is no hydrocarbon adsorbent (i.e. hydrocarbon adsorber) in the one or more other catalyst layers or the first washcoat coating. In relation to the first aspect of the invention, when there is no hydrocarbon adsorbent in the one or more other catalyst layers or the first washcoat coating, then there may be no active metal in the one catalyst layer or second washcoat coating, or is present in a concentration or ratio as defined above.

When a hydrocarbon adsorbent (i.e. hydrocarbon adsorber) is present in both the one catalyst layer or second washcoat coating and the one or more other catalyst layers or first washcoat coating, then hydrocarbon adsorbent may be the same or different. Preferably the hydrocarbon adsorbent in each catalyst layer or washcoat coating is the same.

When the amount of hydrocarbon adsorbent (i.e. hydrocarbon adsorber) in the said one catalyst layer or second washcoat coating is greater than the amount of hydrocarbon adsorbent (i.e. hydrocarbon adsorber) in the said one or more other catalyst layers or first washcoat coating, then the weight of catalyst in the one catalyst layer or second washcoat coating is, typically, less than or about the same as the weight of catalyst in the one or more other catalyst layers or first washcoat coating.

Typically, the washcoat material is a support material for the active metal. The support material is, for example, a metal oxide selected from an oxide of Mg, Si, Ca, Sr, Ba, Al, Ga, In, Sn, a transition metal element, a lanthanide, a complex oxide thereof, and mixtures of two or more thereof. Preferably, the support material is selected from $SiO_2$, $Al_2O_3$, $CeO_2$ and $TiO_2$ or is a complex oxide having $SiO_2$, $Al_2O_3$, $CeO_2$ or $TiO_2$ as its main constituent.

The oxidation catalyst or catalysed substrate monolith may further comprise a catalyst promoter, such cerium oxide, zirconium oxide or titanium oxide.

Generally, the supporting substrate carries the catalyst (e.g. the active metal, hydrocarbon adsorbent, washcoat material, promoter, etc). The supporting substrate may be any that does not lower the combustion efficiency of the engine through problems with pressure loss, etc, and has both durability and reliability.

Typically, the supporting substrate is a ceramic or metallic material. It may, for example, be in a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type. The supporting substrate may be selected from cordierite ($SiO_2$—$Al_2O_3$—MgO), silicon carbide (SiC), Fe—Cr—Al alloy, Ni—Cr—Al alloy, and a stainless steel alloy.

Preferably, the supporting substrate is a substrate monolith.

Typically, the substrate monolith for use in the invention, particularly the second aspect of the invention, can be a filtering substrate monolith having inlet surfaces and outlet surfaces, wherein the inlet surfaces are separated from the outlet surfaces by a porous structure. A particularly preferred filtering substrate monolith is a wall-flow filter. However, in a particularly preferred embodiment, the substrate monolith is a flow-through substrate monolith.

The at least one support material (i.e. washcoat material) of the first washcoat coating or the second washcoat coating may comprise a metal oxide selected from the group consisting of optionally stabilised alumina, amorphous silica-alumina, optionally stabilised zirconia, ceria, titania and an optionally stabilised ceria-zirconia mixed oxide or a molecular sieve or a mixture of any two or more thereof.

The first washcoat coating can extend for substantially an entire length of channels in the substrate monolith. In a first particular embodiment, the second washcoat coating substantially covers the first washcoat coating. In a second embodiment, the second washcoat coating is arranged in a zone of substantially uniform length at a downstream end of the substrate monolith, which zone being defined at a downstream end by the outlet end of the substrate monolith itself and at an upstream end by a point less than the entire length of the first washcoat coating. That is, in the second embodiment, the second washcoat coating does not cover all of the first washcoat coating. Methods of making differential length layered coatings are known in the art, e.g. see WO 99/47260 and hereinbelow.

In any of the first, second and third most preferred embodiments of the catalysed substrate monolith according to the invention, the first washcoat coating may comprise 25-75% by weight of the total platinum group metal present in the first washcoat coating and the second washcoat coating combined, e.g. 35-65% by weight thereof. That is, the second washcoat coating may comprise 75-25% e.g. 65-35%, by weight of the total platinum group metal present in the first washcoat coating and the second washcoat coating combined. The inventors have found that PGM volatilisation is broadly independent of PGM loading in a washcoat coating layer, and more dependent on the weight ratio of Pt:Pd, as explained above. Preferably, however more total PGM is put in the second washcoat coating, because it is more accessible to mass transfer. Accordingly, it is preferred for >50% by weight of the total platinum group metal present in the first washcoat coating and the second washcoat coating combined is present in the second washcoat coating.

An aspect of catalyst design related to a split of total platinum group metal by weight between the first washcoat coating and the second washcoat coating is a washcoat loading in each of the first washcoat coating and the second washcoat coating. In embodiments, the washcoat loading in each of the first washcoat coating and the second washcoat coating is individually selected from the range 0.1-3.5 gin$^{-3}$, e.g. 0.5-2.5 gin$^{-3}$, such as ≥1.5 gin$^{-3}$, ≥2.0 gin$^{-3}$ or ≤2.0 gin$^{-3}$. Higher loadings are preferred e.g. for $NO_x$ adsorber catalysts. However, it is possible to make less "accessible" PGM in the first washcoat coating more accessible to mass transfer by using a lower washcoat loading in second washcoat coating than in the first washcoat coating. That is, in embodiments a washcoat loading in the first washcoat coating is greater than a washcoat loading in the second washcoat loading.

In the second aspect of the present invention, the at least one support material (or washcoat material) may include one or more molecular sieve, e.g. aluminosilicate zeolites. The primary duty of the molecular sieve in the catalysed substrate of the first aspect of the invention is for improving hydrocarbon conversion over a duty cycle by storing hydrocarbon following cold start or during cold phases of a duty cycle and releasing stored hydrocarbon at higher temperatures when associated platinum group metal catalyst components are more active for HC conversion. See for example EP 0830201. Molecular sieves are typically used in catalyst compositions according to the invention for light-duty diesel vehicles, whereas they are rarely used in catalyst compositions for heavy duty diesel applications because the exhaust gas temperatures in heavy duty diesel engines mean that hydrocarbon trapping functionality is generally not required. However, where molecular sieves are present in the catalysed substrate monolith according to the invention, it is highly preferred that at least one of the first washcoat coating and the second washcoat coating includes molecular sieve. Most preferably, both the first washcoat coating and the second washcoat coating includes molecular sieve.

However, molecular sieves such as aluminosilicate zeolites are not particularly good supports for platinum group metals because they are mainly silica, particularly relatively higher silica-to-alumina molecular sieves, which are favoured for their increased thermal durability: they may thermally degrade during ageing so that a structure of the molecular sieve may collapse and/or the PGM may sinter, giving lower dispersion and consequently lower HC and/or CO conversion activity. Accordingly, in a preferred embodiment, the first washcoat coating and the second washcoat coating comprise a molecular sieve at ≤30% by weight (such as ≤25% by weight, ≤20% by weight e.g. ≤15% by weight) of the individual washcoat coating layer. The remaining at least one support material of the first washcoat coating or the second washcoat coating may comprise a metal oxide selected from the group consisting of optionally stabilised alumina, amorphous silica-alumina, optionally stabilised zirconia, ceria, titania and an optionally stabilised ceria-zirconia mixed oxide and mixtures of any two or more thereof.

Preferred molecular sieves for use as support materials/hydrocarbon adsorbers are medium pore zeolites, preferably aluminosilicate zeolites, i.e. those having a maximum ring size of eight tetrahedral atoms, and large pore zeolites (maximum of ten tetrahedral atoms) preferably aluminosilicate zeolites, include natural or synthetic zeolites such as faujasite, clinoptilolite, mordenite, silicalite, ferrierite, zeolite X, zeolite Y, ultrastable zeolite Y, ZSM-5 zeolite, ZSM-12 zeolite, SSZ-3 zeolite, SAPO-5 zeolite, offretite or a beta zeolite, preferably ZSM-5, beta and Y zeolites. Preferred zeolite adsorbent materials have a high silica to alumina ratio, for improved hydrothermal stability. The zeolite may have a silica/alumina molar ratio of from at least about 25/1, preferably at least about 50/1, with useful ranges of from about 25/1 to 1000/1, 50/1 to 500/1 as well as about 25/1 to 100/1, 25/1 to 300/1, from about 100/1 to 250/1.

The oxidation catalyst of the first aspect of the invention or the oxidising catalyst in the catalysed substrate monolith of the second aspect of the present invention may be a diesel oxidation catalyst or a $NO_x$ adsorber catalyst, having duties as described in the background of the invention hereinabove. A NAC contains significant quantities of alkaline earth metals and/or alkali metals relative to an oxidation catalyst. The NAC typically also includes ceria or a ceria-containing mixed oxide, e.g. a mixed oxide of cerium and zirconium, which mixed oxide optionally further including one or more additional lanthanide or rare earth elements.

Methods of making catalysed substrate monoliths, including single layer washcoat coatings and dual layered arrangements (one washcoat coating layer above another washcoat coating layer) are known in the art and include WO 99/47260 (which is incorporated herein by reference), i.e. comprising the steps of (a) locating a containment means on top, first end of a substrate monolith, (b) dosing a pre-determined quantity of a first washcoat coating component into said containment means, either in the order (a) then (b) or (b) then (a), and (c) by applying pressure or vacuum, drawing said first washcoat coating component into at least a portion of the substrate monolith, and retaining substantially all of said quantity within the substrate monolith. In a first step a coating from a first end of application can be dried and the dried substrate monolith can be flipped through 180 degrees and the same procedure can be done to a top, second end of the substrate monolith, with substantially no overlap in layers between applications from the first and second ends of the substrate monolith. The resulting coating product is then dried, then calcined. The process is repeated with a second washcoat coating component, to provide a catalysed (bi-layered) substrate monolith according to the invention.

The filtering substrate monolith for use in the first or second aspect of the invention is preferably a wall-flow filter, i.e. a ceramic porous filter substrate comprising a plurality of inlet channels arranged in parallel with a plurality of outlet channels, wherein each inlet channel and each outlet channel is defined in part by a ceramic wall of porous structure, wherein each inlet channel is alternatingly separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

Catalysed filters, preferably wall-flow filters, can be coated using the method disclosed in WO 2011/080525 (which is incorporated herein by reference). That is, a method of coating a honeycomb monolith substrate comprising a plurality of channels with a liquid comprising a catalyst component, which method comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. The catalyst composition may be coated on filter channels from a first end, following which the coated filter can be dried. Use of such a method can be controlled using, e.g. vacuum strength, vacuum duration, washcoat viscosity, washcoat solids, coating particle or agglomerate size and surface tension so that catalyst is coated predominantly on the inlet surfaces but also optionally within the porous structure but near to the inlet surfaces. Alternatively, the washcoat components may be milled to a size, e.g. D90 <5 µm, so that they "permeate" the porous structure of the filter (see WO 2005/016497) (which is incorporated herein by reference).

The SCR catalyst of the second substrate monolith can comprise a filtering substrate monolith, preferably a wall-flow monolith, or a flow-through substrate monolith. Flow-through substrate monoliths can be extruded SCR catalysts or SCR catalysts washcoated onto inert substrate monoliths. It is also possible to make a wall-flow filter from an extruded SCR catalyst (see WO 2009/093071 and WO 2011/092521) (both of which are incorporated herein by reference). SCR catalysts can be selected from the group consisting of at least one of Cu, Hf, La, Au, In, V, lanthanides and Group VIII transition metals, such as Fe, supported on a refractory oxide or molecular sieve. Suitable refractory oxides include $Al_2O_3$, $TiO_2$, $CeO_2$, $SiO_2$, $ZrO_2$ and mixed oxides containing two or more thereof. Non-zeolite catalyst can also include tungsten oxide, e.g. $V_2O_5/WO_3/TiO_2$. Preferred metals of particular interest are selected from the group consisting of Ce, Fe and Cu. Molecular sieves can be ion-exchanged with any of the above metals.

In particular embodiments, the at least one molecular sieve, is an aluminosilicate zeolite or a SAPO. The at least one molecular sieve can be a small, a medium or a large pore molecular sieve, for example. By "small pore molecular sieve" herein we mean a molecular sieves containing a maximum ring size of 8 tetrahedral atoms, such as CHA; by "medium pore molecular sieve" herein we mean a molecular sieve containing a maximum ring size of 10 tetrahedral atoms, such as ZSM-5; and by "large pore molecular sieve" herein we mean a molecular sieve having a maximum ring size of 12 tetrahedral atoms, such as beta. Small pore molecular sieves are potentially advantageous for use in SCR catalysts—see for example WO 2008/132452. Molecular sieves for use in SCR catalysts according to the invention include one or more metals incorporated into a framework of the molecular sieve, e.g. Fe "in-framework" Beta and Cu "in-framework" CHA.

Particular molecular sieves with application in the present invention are selected from the group consisting of AEI, ZSM-5, ZSM-20, ERI including ZSM-34, mordenite, ferrierite, BEA including Beta, Y, CHA, LEV including Nu-3, MCM-22 and EU-1, with CHA molecular sieves currently preferred, particularly in combination with Cu as promoter, e.g. ion-exchanged.

In an embodiment of the first aspect of the invention, there is no active metal, such as PGM, in the one catalyst layer or second washcoat coating. When there is no active metal in the other catalyst layer or the second washcoat coating, then there may be no hydrocarbon adsorbent in the one or more other catalyst layers or first washcoat coating, or the hydrocarbon adsorbent may be present in a concentration or ratio as defined above.

In a further embodiment of the first aspect of the invention, the first washcoat coating comprises a catalyst composition comprising platinum and at least one support material for the platinum, and the second washcoat coating comprises a catalyst composition comprising both platinum and palladium and at least one support material for the platinum and the palladium and wherein a weight ratio of platinum to palladium in the second washcoat coating is ≤2, such as 1.5:1 or about 1:1, e.g. ≤1:1.

In an embodiment of the second aspect of the invention, the amount of hydrocarbon adsorber or adsorbent (e.g. zeolite) in the second washcoat coating is greater than the amount of hydrocarbon adsorber or adsorbent in the first washcoat coating. Preferably, the concentration of active metal (e.g. platinum and palladium) in the second washcoat coating is the same as or less than, preferably less than, the concentration of active metal (e.g. platinum) in the first washcoat coating. The amount of hydrocarbon adsorbent is as defined above.

In a further embodiment of the second aspect of the invention, the amount of hydrocarbon adsorber or adsorbent (e.g. zeolite) in the second washcoat coating is the same as the amount of hydrocarbon adsorber or adsorbent in the first washcoat coating. Preferably, the concentration of active metal (e.g. platinum and palladium) in the second washcoat coating is less than the concentration of active metal (e.g. platinum) in the first washcoat coating.

Exhaust System

According to the third and sixth aspects, the invention provides an exhaust system for a lean-burn internal combustion engine, which system comprising a first catalysed substrate monolith according to the invention.

In a preferred embodiment, the exhaust system according to the invention, particularly the third aspect of the invention, comprises a second catalysed substrate monolith comprising a selective catalytic reduction (SCR) catalyst, which second catalysed substrate monolith is disposed downstream from the first catalysed substrate monolith. In preferred embodiments, the exhaust system of the invention, particularly the third aspect of the invention, comprises an injector for injecting a nitrogenous reductant into exhaust gas between the first catalysed substrate monolith and the second catalysed substrate monolith. Alternatively, (i.e. without means for injecting ammonia or a precursor thereof such as urea is disposed between the first catalysed substrate monolith and the second catalysed substrate monolith), or in addition to the means for injecting ammonia or a precursor thereof, in another embodiment, engine management means is provided for enriching exhaust gas such that ammonia gas is generated in situ by reduction of $NO_x$ on the catalyst composition of the first catalysed substrate monolith.

Nitrogenous reductants and precursors thereof for use in the present invention include any of those mentioned hereinabove in connection with the background section, e.g. ammonia and urea.

In combination with an appropriately designed and managed diesel compression ignition engine, enriched exhaust gas, i.e. exhaust gas containing increased quantities of carbon monoxide and hydrocarbon relative to normal lean running mode, contacts the catalyst composition of the first substrate monolith. Components within a NAC such as PGM-promoted ceria or ceria-zirconia can promote the water-gas shift reaction, i.e. $CO_{(g)}+H_2O_{(v)} \rightarrow CO_{2(g)}+H_{2(g)}$ evolving $H_2$. From the side reaction footnote to reactions (3) and (4) set out hereinabove, e.g. $Ba(NO_3)_2+8H_2 \rightarrow BaO+ 2NH_3+5H_2O$, $NH_3$ can be generated in situ and stored for $NO_x$ reduction on the downstream SCR catalyst.

In a first most preferred embodiment, the exhaust system of the invention, particularly the third aspect of the invention, comprises a third catalysed substrate monolith, wherein the substrate monolith of the first catalysed substrate monolith is a flow-through substrate monolith, wherein the third catalysed substrate monolith is a filtering substrate monolith having inlet surfaces and outlet surfaces and wherein the inlet surfaces are separated from the outlet surfaces by a porous structure, which third catalysed substrate monolith comprises an oxidation catalyst and is disposed between the first catalysed substrate monolith and the second catalysed substrate monolith and preferably between the first catalysed substrate monolith and any injector for injecting a nitrogenous reductant into exhaust gas between the first catalysed substrate monolith and the second catalysed substrate monolith.

In a second most preferred embodiment, the second catalysed substrate monolith in the exhaust system of the invention, particularly the third aspect of the invention, is a filtering substrate monolith having inlet surfaces and outlet surfaces, wherein the inlet surfaces are separated from the outlet surfaces by a porous structure.

In a third most preferred embodiment, the exhaust system of the invention, particularly the third aspect of the invention, comprises a third substrate monolith, wherein the third substrate monolith is a filtering substrate monolith having inlet surfaces and outlet surfaces, wherein the inlet surfaces are separated from the outlet surfaces by a porous structure, which third substrate monolith is disposed downstream of the second catalysed substrate monolith. In a particular embodiment, the third substrate monolith comprises an oxidation catalyst. That is, in one embodiment the third substrate monolith is devoid of any coating.

In the first, second and third most preferred embodiments of the exhaust system of the invention, particularly the third aspect of the invention, the or each filtering substrate monolith is preferably a wall-flow filter.

The preferred duty of the first catalysed substrate in the second and third most preferred embodiments of the invention, particularly the third aspect of the present invention, is different from that of the first most preferred embodiment thereof. In the second and third most preferred embodiments, the catalysed substrate monolith that follows immediately downstream of the first catalysed substrate monolith is the second substrate monolith comprising the SCR catalyst. In order to promote reaction (6), it is preferable that the first catalysed substrate monolith promotes NO oxidation, yet at the same time avoids volatilisation of PGM and its subsequent migration to the SCR catalyst directly downstream, thereby reducing the overall $NO_x$ conversion activity.

For this duty it is preferable for a Pt:Pd weight ratio of both the first washcoat coating and the second washcoat coating combined is ≥2:1. In order to avoid volatilisation issues, it is preferred that the Pt:Pd weight ratio of both the first washcoat coating and the second washcoat coating combined to be ≤10:1, e.g. ≤8:1, ≤6:1 or ≤4:1. In particular embodiments, preferably the PGM in the first washcoat coating is Pt only, i.e. it is substantially free of palladium. In order to trap any platinum that might volatilise from the first washcoat coating, it is preferred that the weight ratio of platinum to palladium in the second washcoat coating is ≤2, such as 1.5:1 or about 1:1, e.g. ≤1:1.

By "substantially free of palladium" we mean that the palladium is not intentionally provided in a relevant layer. It is recognized, however, that the material may migrate or diffuse from the second washcoat coating to the first washcoat coating in minor amounts considered to be insubstantial (that is <10% of the material, <9%, <8%, <7%, <6%, <5%, <4%, <3%, <2%, or even <1%).

The preferred duty of the first catalysed substrate in the first most preferred embodiment of the invention of the third and sixth aspects of the invention, particularly the third aspect of the present invention, is different from that of the second and third most preferred embodiments, because there is a catalysed soot filter (the third catalysed substrate monolith) disposed between the first substrate monolith and the second substrate monolith. Hence, while it is possible to reduce or prevent PGM volatilisation from the first catalysed substrate monolith and its subsequent migration to downstream components, the fact that there is a catalysed soot filter located downstream from the first substrate monolith, which catalysed soot filter preferably promotes NO oxidation upstream of the second substrate monolith comprising SCR catalyst for the purposes of promoting reaction (6) and for that reason will likely contain a relatively high platinum content, measures for trapping volatilised PGM may be more effectively applied downstream of the first catalysed substrate monolith. For example, the measures for trapping volatilised PGM can be applied to aspects of the design of the catalysed soot filter, e.g. a guard bed may be disposed between the catalysed soot filter and the second catalysed substrate monolith or in an inlet zone to the second catalysed substrate monolith itself. Such measures are disclosed in Applicant/Assignee's sister applications entitled "Catalysed Substrate Monolith"; Exhaust System for a Lean Burn IC Engine comprising a PGM Component and a SCR Catalyst"; and Exhaust System for a Lean-Burn Internal Combustion Engine including SCR Catalyst" filed under reference number 70050, 70051 and 70053 respectively.

So, in the situation of the first most preferred embodiment of the third and sixth aspects of the invention, particularly the third aspect of the present invention, the preferred duty of the first catalysed substrate monolith is to oxidise carbon monoxide and unburned hydrocarbons (volatile organic fraction (VOF) also known as the soluble organic fraction (SOF)) and not necessarily to oxidise NO to $NO_2$ to promote reaction (6).

Preferably, in the catalysed substrate monolith for use in the first most preferred embodiment of the third and sixth aspects of the invention, particularly the third aspect of the present invention, the second washcoat coating comprises both platinum and palladium and the first washcoat coating comprises both platinum and palladium at a higher Pt:Pd weight ratio than in the second washcoat coating. That is where the weight ratio of platinum to palladium in the second washcoat coating is ≤2, such as 1.5:1 or about 1:1, e.g. ≤1:1, the weight ratio in the first washcoat coating is preferably ≥1:2, most preferably about 2:1. In particular embodiments, a Pt:Pd weight ratio of both the first washcoat coating and the second washcoat coating combined is ≥1:1.

Figure 5:
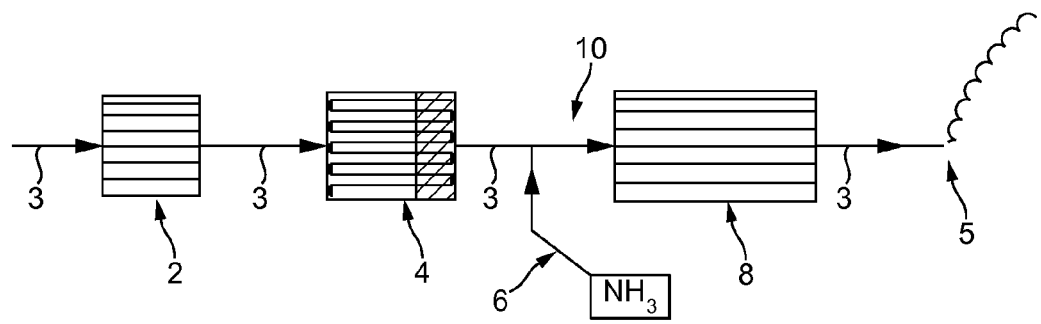
FIG. 5 is a schematic drawing of an exhaust system according to the first most preferred embodiment according to the third aspect of the present invention.

FIG. 5 is a schematic drawing of an exhaust system 10 according to the second most preferred embodiment according to the third aspect of the present invention, comprising, in serial arrangement from upstream to downstream, a flow-through substrate monolith 2 coated with a two layer DOC composition according to the invention; a downstream catalysed wall-flow filter substrate monolith 4 coated on 100% of its inlet channels with 5 gft$^{-3}$ of platinum supported on particulate alumina and 35% of a total length of its outlet channels from with 1.75 gft$^{-3}$ of palladium supported on particulate alumina; a source of ammonia 6 comprising an injector for an ammonia precursor urea; and a flow-through substrate monolith 8 coated with a Fe/Beta SCR catalyst. Each substrate monolith 2, 4, 8 is disposed in a metal container or "can" including coned diffusers and are linked by a series of conduits 3 of smaller cross sectional area than a cross sectional area of any of substrate monoliths 2, 4, 8. The coned diffusers act to spread the flow of exhaust gas entering a housing of a "canned" substrate monolith so that the exhaust gas as a whole is directed across substantially the whole front "face" of each substrate monolith. Exhaust gas exiting substrate monolith 8 is emitted to atmosphere at "tail pipe" 5.

The flow-through substrate monolith 2 coated with the two-layer DOC is designed to promote the oxidation of hydrocarbons, carbon monoxide and nitrogen oxide and has a Pt:Pd weight ratio in the top layer of 2:1 and overall Pt:Pd weight ratio of 6:1. Catalysed wall-flow substrate monolith 4 is described in Applicant/Assignee's sister patent application filed on the same date as the present application entitled "Catalysed Substrate Monolith" with the reference number 70050, the inventors of which invention found that palladium disposed on a downstream end of outlet channels of a wall-flow filter can reduce or prevent platinum that has volatilised from upstream inlet channels of the wall-flow filter and/or an substrate monoliths comprising platinum-containing catalysts such as a DOC upstream from the wall-flow filter from passing downstream to the SCR catalyst thereby poisoning $NO_x$ conversion on the SCR catalyst, possibly through alloying of the volatilised Pt with the palladium. As such, the overall Pt:Pd weight ratio of the two-layer DOC can be relatively high without fear of platinum volatilising from the DOC and passing directly to the SCR catalyst. However, the limit of ≤2:1 for the second washcoat coating limits quantities of platinum that may volatilise from the DOC as far as possible.

Figure 6:
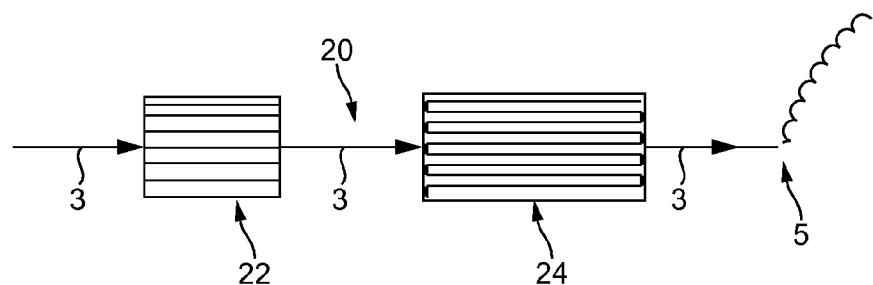
FIG. 6 is a schematic drawing of an exhaust system according to the second most preferred embodiment according to the third aspect of the present invention.

Referring to FIG. 6, there is shown an exhaust system 20 according to the second most preferred embodiment according to the third aspect of the present invention, comprising, in serial order from upstream to downstream, a flow-through substrate monolith 22 homogeneously coated with a layered NAC composition; and a downstream wall-flow filter substrate monolith 24 coated on its inlet channels and outlet channels with a CuCHA SCR catalyst. Each substrate monolith 22, 24 is disposed in a metal container or "can" including coned diffusers and are linked by a series of conduits 3 of smaller cross sectional area than a cross sectional area of either substrate monolith 22, 24.

In combination with an appropriately designed and managed diesel compression ignition engine (upstream of substrate monolith, not shown), enriched exhaust gas, i.e. exhaust gas containing increased quantities of carbon monoxide and hydrocarbon relative to normal lean running mode, contacts the NAC. Components within a NAC such as PGM-promoted ceria or ceria-zirconia can promote the water-gas shift reaction, i.e. $CO_{(g)}+H_2O_{(v)} \rightarrow CO_{2(g)}+H_{2(g)}$ evolving $H_2$. From the side reaction footnote to reactions (3) and (4) set out hereinabove, e.g. $Ba(NO_3)_2+8H_2 \rightarrow BaO+2NH_3+5H_2O$, $NH_3$ can be generated in situ and stored for $NO_x$ reduction on the downstream SCR catalyst of wall-flow substrate monolith 24. Exhaust gas leaving substrate monolith 24 is exhausted to atmosphere at "tail pipe" 5. An upper layer of the layered NAC composition comprises both platinum and palladium in a weight ratio of 2:1, but the overall Pt:Pd weight ratio of the NAC composition as a whole is 4:1 in order to promote NO oxidation upstream of the SCR catalyst.

Figure 7:
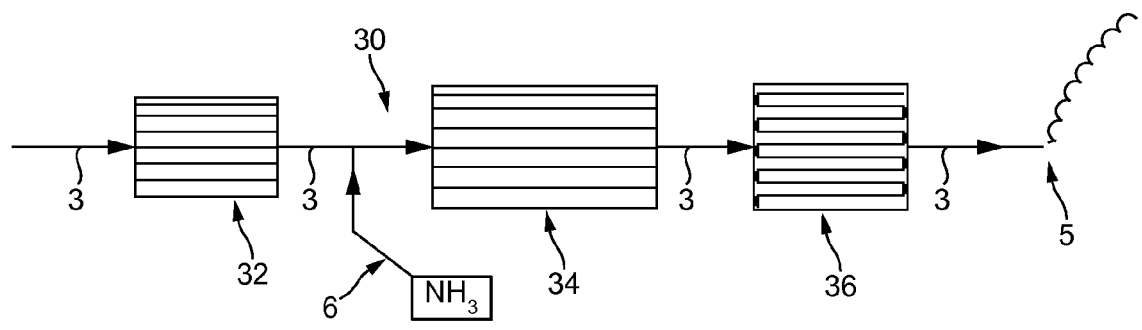
FIG. 7 is a schematic drawing of an exhaust system according to the third most preferred embodiment according to the third aspect of the present invention.

FIG. 7 is a schematic drawing of an exhaust system 30 according to the third most preferred embodiment according to the third aspect of the present invention, comprising, in serial order from upstream to downstream, a flow-through substrate monolith 32 homogeneously coated with a two-layer DOC composition; a source of ammonia 6 comprising an injector for an ammonia precursor urea; a downstream flow-through monolith substrate 34 coated with a CuCHA SCR catalyst; and a downstream catalysed soot filter based on a wall-flow filter substrate 36. Each substrate monolith 32, 34, 36 is disposed in a metal container or "can" including coned diffusers and are linked by a series of conduits 3 of smaller cross sectional area than a cross sectional area of either substrate monolith 32, 34, 36.

In this embodiment, the flow-through substrate monolith 34 coated with the SCR catalyst is in direct fluid communication with the flow through substrate monolith 32 comprising the DOC. In order to reduce or prevent platinum group metals from volatilising from the DOC and migrating to the SCR catalyst, the two-layer DOC composition is designed to include both platinum and palladium in the second washcoat coating at a Pt:Pd weight ratio of 2:1. To promote NO oxidation thereby to promote reaction (1) and (6), the overall Pt:Pd weight ratio is 4:1

As explained hereinabove, the system of FIG. 7 is a preferred system arrangement for light-duty diesel because an important consideration is to achieve $NO_x$ conversion in an exhaust system as quickly as is possible after a vehicle engine is started to enable (i) precursors of nitrogenous reductants such as ammonia to be injected/decomposed in order to liberate ammonia for $NO_x$ conversion; and (ii) as high $NO_x$ conversion as possible.

Vehicles

The invention is for use in the exhaust systems of vehicles fitted with an internal combustion engine. Specific examples of vehicles using an internal combustion engine may be listed as: cars, buses, lorries, locomotives, motorcycles, motorised bicycles and heavy construction machines, etc; transporters such as aircraft; forestry and agriculture machinery such as ploughs, tractors, combines, chainsaw trucks and timber carriers; shipping such as ships, fishing vessels and motorboats; civil engineering machinery such as cranes, compacters and excavators; and generators. However, application is not limited thereto.

Definitions

The expression "oxidation catalyst" as used herein, particularly with reference to the first aspect of the invention, generally refers to the combination of a substrate and an oxidising catalyst, such as the oxidising catalyst in the second aspect of the invention.

The expression "plurality of catalyst layers" as used herein, particularly with reference to the first aspect of the invention, includes the "one catalyst layer" and the one or more "other catalyst layers". The "one catalyst layer" can lie directly on top of or be disposed on the one or more "other catalyst layers" (e.g. the uppermost of the "other catalyst layers") or one or more intervening layers (e.g. layers that are not "catalyst layers") may be disposed between the "one catalyst layer" and the one or more "other catalyst layers".

The expression "catalyst surface layer side" as used herein, particularly with reference to the first aspect of the invention, refers to the side of the oxidation catalyst that is first exposed to an exhaust gas, which is usually the outermost catalyst layer.

The expression "side lower than the said one catalyst layer" as used herein, particularly with reference to the first aspect of the invention, refers to the part or area of the oxidation catalyst that is between the "one catalyst layer" and the "supporting substrate".

The expression "plurality of catalyst layers comprise a washcoat material, an active metal and a hydrocarbon adsorbent" as used herein, particularly with reference to the first aspect of the invention, refers to two or more catalyst layers where the combination of all of the catalyst layers (i.e. the totality of the layers) comprise the washcoat material, the active metal and the hydrocarbon adsorbent. Thus, the washcoat material, the active metal and the hydrocarbon adsorbent do not have to be present in each and every catalyst layer. Typically, however, each catalyst layer comprises, consists essentially of, or consists of a washcoat material and at least one of an active metal or a hydrocarbon adsorbent. Thus, the "one catalyst layer" may comprise, consist essentially of, or consist of a washcoat material and a hydrocarbon adsorbent, and the "one or more other catalyst layers" may comprise, consist essentially of, or consist of a washcoat material and at least one of an active metal. However, in general, each catalyst layer comprises, consists essentially of, or consists of a washcoat material, an active metal and a hydrocarbon adsorbent.

The expression "amount of hydrocarbon adsorbent" as used herein, particularly with reference to the first aspect of the invention, refers to the total amount of hydrocarbon adsorbent that is present. Thus, the "amount of hydrocarbon adsorbent in the one catalyst layer" refers to the total amount of hydrocarbon adsorbent in the "one catalyst layer". The "amount of hydrocarbon adsorbent in the one or more other catalyst layers" refers to the total amount of hydrocarbon adsorbent that is present in all of the "other catalyst layers". Typically, the "amount of hydrocarbon adsorbent" is measured as the "mass of hydrocarbon adsorbent" (e.g. the weight of hydrocarbon adsorbent). If more than one type of hydrocarbon adsorbent is present, then the "amount" refers to the total amount of all types of hydrocarbon present.

The expression "concentration of active metal" as used herein, particularly in relation to the first aspect of the invention, refers to the proportion of the weight of active metal to the overall weight of the respective catalyst layer, expressed as a weight percentage. The "concentration of active metal in the one catalyst layer" refers to the total concentration of active metal or metals in the "one catalyst layer". The "concentration of active metal in the one or more other catalyst layers" refers to the total concentration of active metal or metals in all of the "other catalyst layers".

The expression "the concentration of active metal in the said one catalyst layer is the same as . . . the concentration of active metal in the said one or more other catalyst layers" as used herein, particularly in relation to the first aspect of the invention, embraces concentrations that differ by only 1% from their mean value, preferably 0.1% from their mean value, or more preferably 0.01% from their mean value. Typically, the concentrations are, for all intents and purposes, the same when measured by standard, conventional methods for measuring the concentration.

The expression "the amount of hydrocarbon adsorbent in the said one catalyst layer is the same as the amount of hydrocarbon adsorbent in the said one or more other catalyst layers" as used herein, particularly in relation to the first aspect of the invention, embraces amounts that differ by only 1% from their mean value, preferably 0.1% from their mean value, or more preferably 0.01% from their mean value. Typically, the amounts are, for all intents and purposes, the same when measured by standard, conventional methods for measuring the amount.

The expression "the weight of active metal in the said one catalyst layer is about the same as the weight of active metal in the said one or more other catalyst layers" as used herein, particularly in relation to the first aspect of the invention, embraces weights that differ by only 1% from their mean value, preferably 0.1% from their mean value, or more preferably 0.01% from their mean value. Typically, the weights are, for all intents and purposes, the same when measured by standard, conventional methods for measuring the weight.

Any reference to a "weight of catalyst" as used herein, particularly with reference to the first aspect of the invention, relates to the weight of the washcoat coating (e.g. the washcoat comprising the active metal, hydrocarbon adsorbent and washcoat material) that is applied to a supporting substrate. Typically, the expression "one catalyst layer" as used herein, particularly with reference to the first aspect of the invention, is synonymous with the expression "second washcoat coating" that is used in other aspects of the invention. Similarly, the expression "other catalyst layer" as used herein, particularly with reference to the first aspect of the invention, is typically synonymous with the expression "first washcoat coating" that is used in other aspects of the invention.

For the avoidance of doubt, the term "a second washcoat coating, wherein the second washcoat coating is disposed in a layer above the first washcoat coating" means that the second washcoat coating can lie directly on top of the first washcoat coating or that one or more intervening layers may be disposed between the first washcoat coating and the second washcoat coating. Three-layer catalyst compositions are known in both the DOC and NAC arts (see UK patent application no. 1021649.7 filed on 21 Dec. 2010 in the name of the Applicant/Assignee respectively).

The expression "consisting essentially of" as used herein limits the scope of a claim or a feature in a claim to include the specified materials or steps and any other materials or steps that do not materially affect the basic characteristics of the claimed invention. It has a meaning that is intermediate between the expressions "consisting of" and "comprising".

EXAMPLES

The invention will now be illustrated by the following non-limiting examples.

Reference Example 1

1) Preparation of One Catalyst Layer (Surface Layer Side)

Pt and Pd (2:1) as active metals were mixed with alumina ($Al_2O_3$) as the washcoat material and zeolite as the hydrocarbon adsorbent, and a slurry of the "one catalyst layer" was prepared. The amount of hydrocarbon adsorbent present was 12 g per litre of support and the concentration of active metal was 0.4 wt %. The weight of catalyst per litre of support was 50 g (active metal 0.2 g).

2) Preparation of Other Catalyst Layer (Support Side)

Pt and Pd (2:1) as active metals were mixed with alumina ($Al_2O_3$) as washcoat material and zeolite as hydrocarbon adsorbent, and a slurry of the "other catalyst layer" was prepared. The amount of hydrocarbon adsorbent present was 30 g per litre of support and the concentration of active metal was 1.7 wt %. The weight of catalyst per litre of support was set at 105 g (active metal 1.785 g).

3) Coating onto Supporting Substrate

Firstly, an NGK 1.3 litre honeycomb support substrate was coated with the slurry for the "other catalyst layer". Calcination was then carried out. Next, the slurry for the "one catalyst layer" was coated over the "other catalyst layer". Calcination was then carried out, affording Reference Example 1.

Reference Example 2

1) Preparation of One Catalyst Layer (Surface Layer Side)

Pt and Pd (2:1) as active metals were mixed with alumina ($Al_2O_3$) as washcoat material and zeolite as hydrocarbon adsorbent, and a slurry of the "one catalyst layer" was prepared. The amount of hydrocarbon adsorbent present was 12 g per litre of support and the concentration of active metal was 2 wt %. The weight of catalyst per litre of support was set at 90 g (active metal 1.8 g).

2) Preparation of Other Catalyst Layer (Support Side)

Pt and Pd (2:1) as active metals were mixed with alumina ($Al_2O_3$) as washcoat material and zeolite as hydrocarbon adsorbent, and a slurry of the "other catalyst layer" was prepared. The amount of hydrocarbon adsorbent present was 30 g per litre of support and the concentration of active metal was 0.3 wt %. The weight of catalyst per litre of support was set at 65 g (active metal 0.195 g).

3) Coating onto Supporting Substrate

Reference Example 2 was obtained as in Reference Example 1.

Evaluation Test 1

The finished catalyst was heat treated in an oven at 800° C. for 20 hrs and then mounted in the exhaust pipe of a 4-in-line diesel engine. Using commercial diesel oil (JIS 2), a transient activity test was run with the actual exhaust gas and the catalyst performance was evaluated.

Test Results 1

The results are given in Table 1. The $T_{50}$ (the catalyst inlet temperature when the conversion reaches 50%—a higher catalyst performance is indicated the lower the numerical value of $T_{50}$) was low for Reference Example 2, suggesting that the catalyst activity of Reference Example 1 was higher than in Reference Example 2.

TABLE 1

| | $COT_{50}$: ° C. |
|---|---|
| Reference Example 1 | 188 |
| Reference Example 2 | 202 |

Reference Example 3

1) Preparation of One Catalyst Layer (Surface Layer Side)

Pt and Pd (2:1) as active metals were mixed with alumina ($Al_2O_3$) as washcoat material and zeolite as hydrocarbon adsorbent, and a slurry of the "one catalyst layer" was prepared. The amount of hydrocarbon adsorbent present was 30 g per litre of support and the concentration of active metal was 1.7 wt %. The weight of catalyst per litre of support was 105 g (active metal 1.785 g).

2) Preparation of Other Catalyst Layer (Support Side)

Pt and Pd (2:1) as active metals were mixed with alumina ($Al_2O_3$) as washcoat material and zeolite as hydrocarbon adsorbent, and a slurry of the "other catalyst layer" was prepared. The amount of hydrocarbon adsorbent present was 12 g per litre of support and the concentration of active metal was 0.4 wt %. The weight of catalyst per litre of support was set at 50 g (active metal 0.2 g).

3) Coating onto the Supporting Substrate

Reference Example 3 was obtained as in Reference Example 1.

Evaluation Test 2

The finished catalyst was heat treated in an oven at 800° C. for 20 hrs and then mounted in the exhaust pipe of a 4-in-line diesel engine. Using commercial diesel oil (JIS 2) a transient activity test was run with the actual exhaust gas and the catalyst performance was evaluated.

Test Results 2

The results are given in Table 2 and suggested the catalyst activity of Reference Example 3 was higher than that of Reference Example 2.

TABLE 2

| | $COT_{50}$: ° C. |
|---|---|
| Reference Example 3 | 193 |
| Reference Example 2 | 202 |

Example 1

1) Preparation of One Catalyst Layer (Surface Layer Side)

Pt as an active metal was mixed with alumina ($Al_2O_3$) as washcoat material and zeolite as hydrocarbon adsorbent, and a slurry of the "one catalyst layer" was prepared. The amount of hydrocarbon adsorbent present was 24 g per litre of support and the concentration of active metal was 0.2 wt %. The weight of catalyst per litre of support was 90 g (active metal 0.18 g).

2) Preparation of Other Catalyst Layer (Support Side)

Pt as an active metal was mixed with alumina ($Al_2O_3$) as washcoat material and zeolite as hydrocarbon adsorbent, and a slurry of the "other catalyst layer" was prepared. The amount of hydrocarbon adsorbent present was 6 g per litre of support and the concentration of active metal was 2.2 wt %. The weight of catalyst per litre of support was set at 90 g (active metal 1.98 g).

3) Coating onto the Supporting Substrate

Example 1 was obtained using the same method as described in Reference Example 1.

Reference Example 4

1) Preparation of One Catalyst Layer (Surface Layer Side)

Pt as an active metal was mixed with alumina ($Al_2O_3$) as washcoat material and zeolite as hydrocarbon adsorbent, and a slurry of the "one catalyst layer" was prepared. The amount of hydrocarbon adsorbent present was 15 g per litre of support and the concentration of active metal was 1.2 wt %. The weight of catalyst per litre of support was 90 g (active metal 1.08 g).

2) Preparation of Other Catalyst Layer (Support Side)

Pt as an active metal was mixed with alumina ($Al_2O_3$) as washcoat material and zeolite as hydrocarbon adsorbent, and a slurry of the "other catalyst layer" was prepared. The amount of hydrocarbon adsorbent present was 15 g per litre of support and the concentration of active metal was 1.2 wt %. The weight of catalyst per litre of support was set at 90 g (active metal 1.08 g).

3) Coating on the Supporting Substrate

Reference Example 4 was obtained as in Reference Example 1.

Reference Example 5

1) Preparation of One Catalyst Layer (Surface Layer Side)

Pt as an active metal was mixed with alumina ($Al_2O_3$) as washcoat material and zeolite as hydrocarbon adsorbent, and a slurry of the "one catalyst layer" was prepared. The amount of hydrocarbon adsorbent present was 6 g per litre of support and the concentration of active metal was 2.2 wt %. The weight of catalyst per litre of support was 90 g (active metal 1.98 g).

2) Preparation of Other Catalyst Layer (Support Side)

Pt as an active metal was mixed with alumina ($Al_2O_3$) as washcoat material and zeolite as hydrocarbon adsorbent, and a slurry of the "other catalyst layer" was prepared. The amount of hydrocarbon adsorbent present was 24 g per litre of support and the concentration of active metal was 0.2 wt %. The weight of catalyst per litre of support was set at 90 g (active metal 0.18 g).

3) Coating on the Supporting Substrate

Reference Example 5 was obtained as in Reference Example 1.

Evaluation Test 3

The finished catalyst was heat treated in an oven at 800° C. for 20 hrs and then mounted in the exhaust pipe of a 4-in-line diesel engine. Using commercial diesel oil (JIS 2), a transient activity test was run with the actual exhaust gas and the catalyst performance was evaluated.

Test Results 3

The results are given in Table 3 and suggest that catalyst activity is distinctly higher in Example 1 than Reference Examples 4 and 5. The results hence indicated that, in a comparison at uniform catalyst weight in the one catalyst layer and other catalyst layer, the CO oxidation activity improved because of a catalyst structure wherein the amount of hydrocarbon adsorbent present in the one catalyst layer was greater than the concentration present in the other catalyst layer, and the concentration of active metal present in the one catalyst layer was less than the concentration of the aforesaid active metal present in the other catalyst layer.

TABLE 3

|  | $COT_{50}$: ° C. |
|---|---|
| Example 1 | 180 |
| Reference Example 4 | 199 |
| Reference Example 5 | 198 |

Example 2

Preparation of Substrate Monolith Coated with 3 wt % Cu/CHA Zeolite

Commercially available aluminosilicate CHA zeolite was added to an aqueous solution of $Cu(NO_3)_2$ with stiffing. The slurry was filtered, then washed and dried. The procedure can be repeated to achieve a desired metal loading. The final product was calcined. After mixing, binders and rheology modifiers were added to form a washcoat composition.

A 400 cpsi cordierite flow-through substrate monolith was coated with an aqueous slurry of the 3 wt % Cu/CHA zeolite sample using the method disclosed in Applicant/Assignee's WO 99/47260, i.e. comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. This coated product (coated from one end only) is dried and then calcined and this process is repeated from the other end so that substantially the entire substrate monolith is coated, with a minor overlap in the axial direction at the join between the two coatings. The coated substrate monolith was aged in a furnace in air at 500° C. for 5 hours. A core of 1 inch (2.54 cm) diameter×3 inches long (7.62 cm) was cut from the finished article.

Example 3

Preparation of Diesel Oxidation Catalyst A

Platinum nitrate and palladium nitrate were added to an aqueous slurry of particulate silica-alumina. Beta zeolite was added to the slurry such that it comprised <30% of the solids content as zeolite by mass to create a washcoat slurry. The washcoat slurry was dosed onto a 400 cpsi flow-through substrate monolith using the method disclosed in WO 99/47260. The dosed part was dried and then calcined at 500° C. The Pt:Pd weight ratio in the first washcoat coating layer was 2:1.

A second aqueous washcoat slurry was prepared as described above but with different amounts of platinum nitrate and palladium nitrate. This second washcoat coating slurry was dosed on top of the previously coated first layer using the same methods as used for applying the first washcoat coating. The second coating was dried and then calcined at 500° C. The Pt:Pd weight ratio in the second washcoat coating layer was 1:1.6 and the total PGM loading in the first washcoat coating and the second washcoat coating combined was 1:1. The total washcoat loading of the first and second washcoat coatings combined was 3.0 $gin^{-3}$ and the total platinum group metal loading of in the first washcoat coating and the second washcoat coating combined was 120 $gft^{-3}$.

A core of 1 inch (2.54 cm) diameter×3 inches (7.62 cm) long was cut from the finished article. The resulting part is described as "fresh", i.e. unaged.

Reference Example 6

Preparation of Diesel Oxidation Catalyst B

Platinum nitrate and palladium nitrate were added to an aqueous slurry of particulate stabilised alumina. Beta zeolite was added to the slurry such that it comprised <30% of the solids content as zeolite by mass. The washcoat slurry was dosed onto a 400 cpsi flow-through substrate monolith using the same method as Example 3. The coated part was dried and then calcined at 500° C. The Pt:Pd weight ratio in the first washcoat coating was 2:1.

A second aqueous washcoat slurry was prepared by adding platinum nitrate to a particulate alumina slurry. Beta zeolite was added to the slurry such that it comprised <30% of the solids content as zeolite by mass. This washcoat was dosed on top of the previously coated first layer using the same method as previous. The second washcoat coating layer was then dried and the part was calcined at 500° C. The Pt:Pd weight ratio in the second washcoat coating was 1:0 and the total washcoat loading of the first washcoat coating and the second washcoat coating combined was 3.0 gin$^{-3}$, with a majority of washcoat loading in the lower layer. The total platinum group metal loading of the first and second washcoat coatings combined was 85 gft$^{-3}$. The Pt:Pd weight ratio of both the first washcoat coating and the second washcoat coating combined was 4:1. A core of 1 inch (2.54 cm) diameter×3 inches (7.62 cm) long was cut from the finished article. The resulting part may be described as "fresh", i.e. unaged.

Example 4

Preparation of Diesel Oxidation Catalyst C

Platinum nitrate was added to an aqueous slurry of alumina. Beta zeolite was added to the slurry such that it comprised <30% of the solids content as zeolite by mass. The washcoat slurry was dosed onto a 400 cpsi flow-through substrate monolith using the same method as Example 2. The dosed part was dried and then calcined at 500° C. This first coating layer had a Pt:Pd weight ratio of 1:0.

A second aqueous washcoat slurry was prepared by adding platinum nitrate and palladium nitrate to slurry of particulate alumina. Beta zeolite was added to the slurry such that it comprised <30% of the solids content as zeolite by mass. This second washcoat slurry was dosed on top of the previously coated first layer. The second washcoat coating was dried and calcined at 500° C. The second washcoat layer had a Pt:Pd ratio of 2:1. The Pt:Pd weight ratio of both the first washcoat coating and the second washcoat coating combined was 4:1 and the total platinum group metal loading of both layers combined was 85 gft$^{-3}$. The total washcoat loading of both the first and second layers combined was 3.0 gin$^{-3}$ with a majority of the washcoat loading being in the second washcoat coating.

A core of 1 inch (2.54 cm) diameter×3 inches (7.62 cm) long was cut from the finished article. The resulting part may be described as "fresh", i.e. unaged.

Example 5

System Tests

The tests were performed on a first synthetic catalyst activity test (SCAT) laboratory reactor illustrated in FIG. 1, in which an aged core of the coated Cu/CHA zeolite SCR catalyst of Example 1 was disposed in a conduit downstream of a core of either the Diesel Oxidation Catalyst (DOC) B (according to Reference Example 6) or C (according to Example 4). A synthetic gas mixture was passed through the conduit at a rate of 6 litres per minute. A furnace was used to heat (or "age") the DOC samples at a steady-state temperature at a catalyst outlet temperature of 900° C. for 2 hours. The SCR catalyst was disposed downstream of the DOC sample and was held at a catalyst temperature of 300° C. during the ageing process by adjusting the length of tube between the furnace outlet and the SCR inlet, although a water cooled heat exchanger jacket could also be used as appropriate. Temperatures were determined using appropriately positioned thermocouples ($T_1$ and $T_2$). The gas mixture used during the ageing was 40% air, 50% $N_2$, 10% $H_2O$.

Following the DOC ageing, the SCR catalysts were removed from the first SCAT reactor and inserted into a second SCAT reactor specifically to test $NH_3$—SCR activity of the aged samples. The SCR catalysts were then tested for SCR activity at 500° C. using a synthetic gas mixture ($O_2$=10%; $H_2O$=5%; $CO_2$=7.5%; CO=330 ppm; $NH_3$=400 ppm; NO=500 ppm; $NO_2$=0 ppm; $N_2$=balance, i.e. an alpha value of 0.8 was used (ratio of $NH_3$:$NO_x$), so that the maximum possible $NO_x$ conversion available was 80%) and the resulting $NO_x$ conversion was plotted against temperature on the accompanying bar chart in FIG. 2. This plot essentially measures competition between reaction (9) and reaction (5) and thus how much reaction (9) affects the $NO_x$ conversion by consumption of the available $NH_3$ needed for the SCR reaction (reaction (5)).

Figure 2:
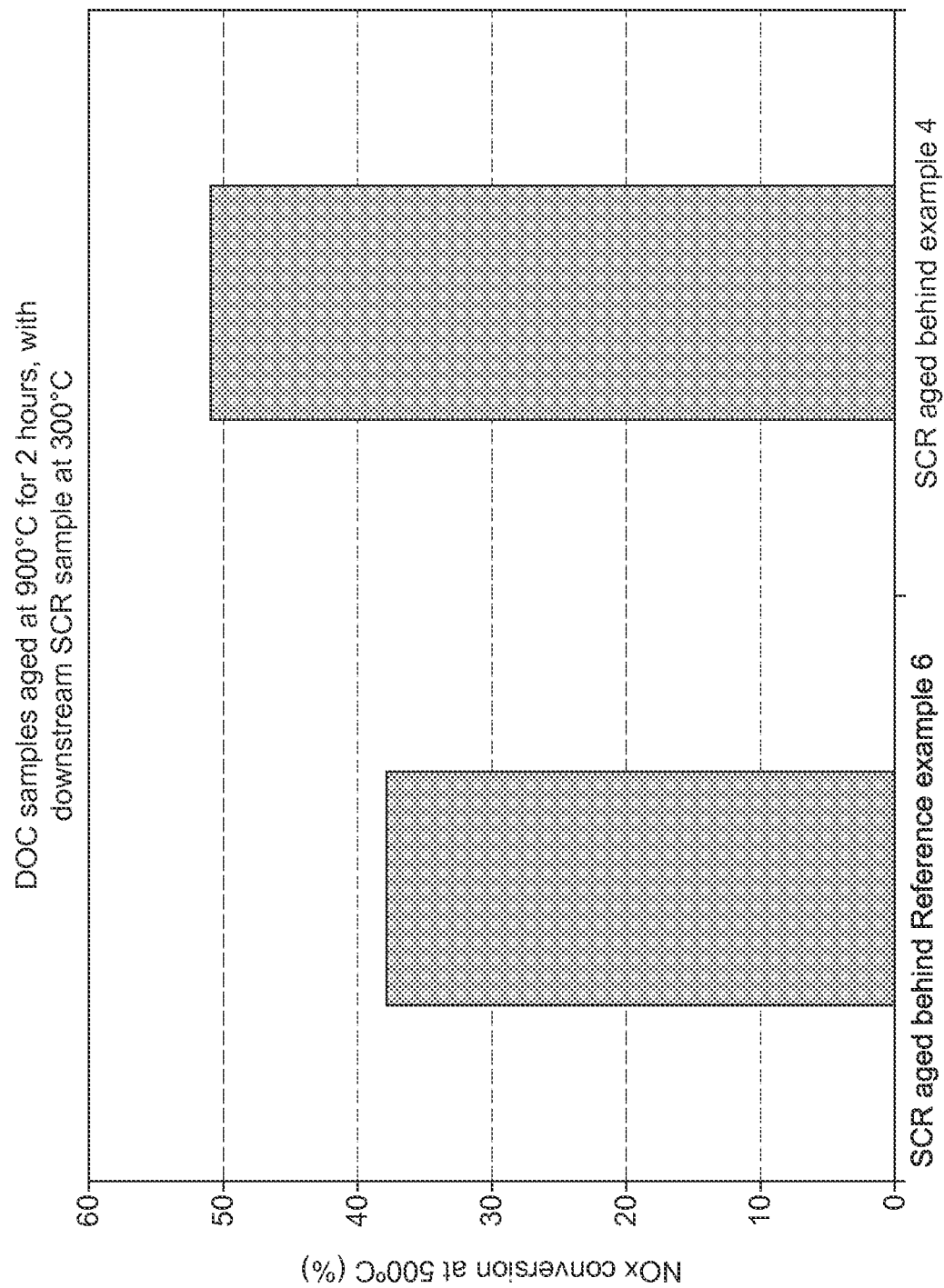
FIG. 2 is a bar chart comparing the $NO_x$ conversion activity of two aged SCR catalyst cores at 500° C. (alpha 0.8, i.e. $NH_3:NO_x$) each of which has been aged in the laboratory-scale exhaust system shown in FIG. 1 containing core samples of the diesel oxidation catalyst of Reference Example 6 and Example 4 heated in a tube furnace at 900° C. for 2 hours in a flowing synthetic exhaust gas with the Cu/CHA zeolite SCR catalyst core held at 300° C. located downstream.

It can be seen from the results presented in FIG. 2 that DOC C (according to Example 4) retains a higher proportion of $NO_x$ conversion activity than of DOC B (according to Reference Example 6). The inventors interpret this result as indicating that, in the conditions used for the test, Pt is more readily volatilised from the DOC B outer layer, which has a Pt:Pd weight ratio of 1:0, than in the reverse arrangement of DOC C, where the outer layer has a Pt:Pd weight ratio of 2:1, yet the combined overall Pt:Pd weight ratio of both layers in both cases was equal, i.e. 4:1.

Example 6

Preparation of Substrate Monolith Coated with 5 wt % Fe/Beta Zeolite

Commercially available Beta zeolite was added to an aqueous solution of $Fe(NO_3)_3$ with stirring. After mixing, binders and rheology modifiers were added to form a washcoat composition.

A 400 cpsi cordierite flow-through substrate monolith was coated with an aqueous slurry of the 5 wt % Fe/Beta zeolite sample using the method disclosed in Applicant/Assignee's WO 99/47260, as described in Example 2 hereinabove. This coated product (coated from one end only) is dried and then calcined and this process is repeated from the other end so that substantially the entire substrate monolith is coated, with a minor overlap in the axial direction at the join between the two coatings. A core of 1 inch (2.54 cm) diameter×3 inches long (7.62 cm) was cut from the finished article.

Reference Example 7

Preparation of Pt-Only Catalysed Wall-Flow Filter

A washcoat composition comprising a mixture of alumina particles milled to a relatively high particle size distribution, platinum nitrate, binders and rheology modifiers in deionised water was prepared. An aluminium titanate wall-flow filter was coated with the catalyst composition at a washcoat loading of 0.2 g/in$^3$ to a final total Pt loading of 5 g/ft$^{-3}$ using the method and apparatus disclosed in the Applicant/Assignee's WO 2011/080525, wherein channels at a first end intended for orientation to an upstream side were coated for 75% of their total length with a washcoat comprising platinum nitrate and particulate alumina from the intended upstream end thereof; and channels at an opposite end and intended to be oriented to a downstream side are coated for 25% of their total length with the same washcoat as the inlet channels. That is, the method comprised the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. The catalyst composition was coated on filter channels from a first end, following which the coated filter was dried. The dried filter coated from the first end was then turned and the method was repeated to coat the same catalyst to filter channels from the second end, followed by drying and calcining A core of 1 inch (2.54 cm) diameter×3 inches (7.62 cm) long was cut from the finished article. The resulting part may be described as "fresh", i.e. unaged.

Example 7

Preparation of 1:1 Weight % Pt:Pd Containing Catalysed Wall-Flow Filter

A coated filter was prepared using the same method as in Reference Example 7, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft³ Pt, 5 g/ft³ Pd loading on both the inlet surfaces and the outlet surfaces, i.e. a total PGM loading of 10 g/ft³.

A core of 1 inch (2.54 cm) diameter×3 inches long was cut from the finished article. The resulting part may be described as "fresh", i.e. unaged.

Example 8

Preparation of 5:1 Weight % Pt:Pd Containing Catalysed Wall-Flow Filter

A coated filter was prepared using the same method as in Reference Example 7, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft³ Pt, 1 g/ft³ Pd loading on both the inlet surfaces and the outlet surfaces, i.e. a total PGM loading of 6 g/ft³.

A core of 1 inch (2.54 cm) diameter×3 inches long was cut from the finished article. The resulting part may be described as "fresh", i.e. unaged.

Example 9

System Tests

The tests were performed on a first synthetic catalyst activity test (SCAT) laboratory reactor illustrated in FIG. 1, in which a fresh core of the coated Fe/Beta zeolite SCR catalyst of Example 2 is disposed in a conduit downstream of a core of either the catalysed wall-flow filter of Reference Example 7 or of Example 7 or 8. A synthetic gas mixture was passed through the conduit at a catalyst swept volume of 30,000 hr$^{-1}$. A furnace was used to heat (or "age") the catalysed wall-flow filter sample at a steady-state temperature at a filter inlet temperature of 900° C. for 60 minutes, during which the inlet SCR catalyst temperature was 300° C. using. An air (heat exchanger) or water cooling mechanism was used to effect the temperature drop between the filter and the SCR catalyst. The gas mixture during the ageing was 10% $O_2$, 6% $H_2O$, 6% $CO_2$, 100 ppm CO, 400 ppm NO, 100 ppm HC as Cl, balance $N_2$.

Following ageing, the aged SCR catalysts were removed from the first SCAT reactor and inserted into a second SCAT reactor specifically to test $NH_3$-SCR activity of the aged samples. The aged SCR catalysts were then tested for SCR activity at 150, 200, 250, 300, 350, 450, 550 and 650° C. using a synthetic gas mixture ($O_2$=14%; $H_2O$=7%; $CO_2$=5%; $NH_3$=250 ppm; NO=250 ppm; $NO_2$=0 ppm; $N_2$=balance) and the resulting $NO_x$ conversion was plotted against temperature for each temperature data point in FIG. 2. This plot essentially measures competition between reaction (9) and reaction (5) and thus how much reaction (9) affects the NOx conversion by consumption of the available $NH_3$ needed for the SCR reaction (reaction (5)).

Figure 3:
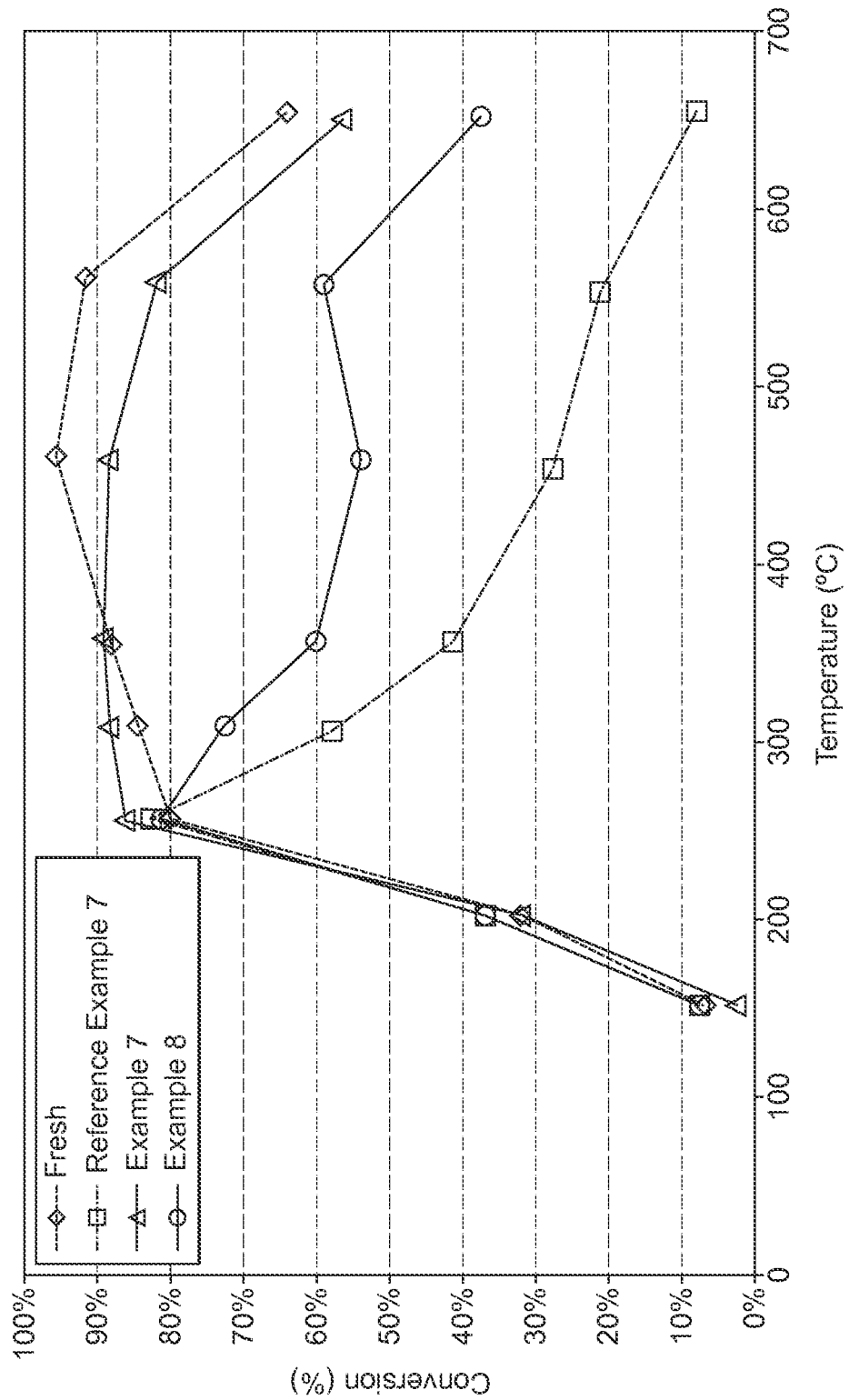
FIG. 3 is a graph plotting the results of $NO_x$ conversion activity as a function of temperature for a fresh Fe/Beta zeolite SCR catalyst compared with the activity of Fe/Beta zeolite SCR catalysts aged in the laboratory scale exhaust system shown in FIG. 1 containing catalysed soot filter cores of Reference Example 7 and Examples 7 and 8.

The results are plotted graphically in FIG. 3. Referring to FIG. 3, it can be seen that the Fe/Beta zeolite SCR catalyst aged behind the catalysed soot filter having a Pt:Pd weight ratio of 1:0 (i.e. Reference Example 7) has significantly reduced overall $NO_x$ conversion activity compared with the fresh sample. The catalysed soot filter of Example 8, which has a Pt:Pd weight ratio of 5:1, has improved $NO_x$ conversion activity compared with Reference Example 7. However, Example 7, which has a Pt:Pd weight ratio of 1:1, has demonstrably similar performance to that of the unaged SCR catalyst. Substantially no loss in activity was seen between a fresh Fe/Beta catalyst and a Fe/Beta catalyst aged at 300° C. for 1 hour without any catalyst present upstream (results not shown).

Example 10

Further Pt:Pd Weight Ratio Studies

Two further diesel oxidation catalysts were prepared as follows:

Diesel Oxidation Catalyst D

A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow through substrate using the method of Example 3. The dosed part was dried and then calcined at 500° C. The total platinum group metal loading in the washcoat coating was 60 gft$^{-3}$ and the total Pt:Pd weight ratio was 4:1.

A core of 1 inch (2.54 cm) diameter×3 inches (7.62 cm) long was cut from the finished article. The resulting part may be described as "fresh", i.e. unaged.

Diesel Oxidation Catalyst E

A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow-through substrate using the same method as used for DOC D. The dosed part was dried and then calcined at 500° C. The total PGM loading in the single layer DOC was 120 g/ft³ and the Pt:Pd weight ratio was 2:1. A core of 1 inch (2.54 cm) diameter×3 inches (7.62 cm) long was cut from the finished article. The resulting part may be described as "fresh", i.e. unaged.

Both catalysts were tested according the protocols set out in Example 5. The results are set out in FIG. 4 with reference to a control (aged SCR catalyst that has not been further aged downstream of either DOC D or DOC E).

Conclusions

Figure 4:
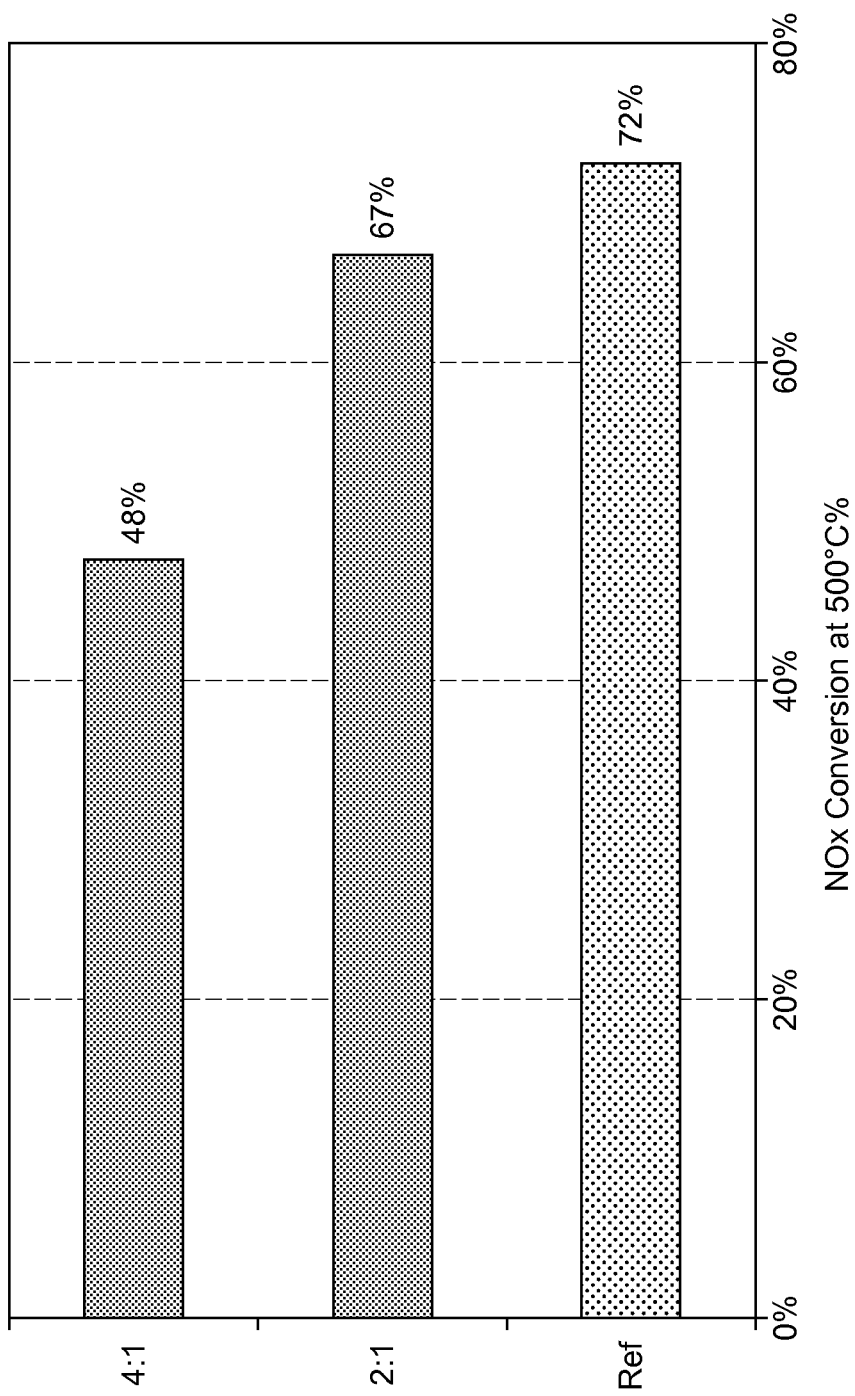
FIG. 4 is a bar chart showing the $NO_x$ conversion activity of two different Cu/CHA SCR catalyst each of which has been aged downstream of diesel oxidation catalysts of Example 10 and having an overall Pt:Pd weight ratio of 4:1 and 2:1 relative to a control sample of the SCR catalyst.

Taken as a whole, the results of Example 9 shown in FIG. 3 in connection with Examples 7 and 8 and Reference Example 7 indicate that a Pt:Pd weight ratio of between 1:1 and 5:1 is beneficial in reducing the problem of $NO_x$ conversion activity loss through volatilisation of platinum group metal, principally platinum, from a platinum group metal containing catalyst to a downstream SCR catalyst; and The results of Examples 5 and 10 shown in FIG. 4 in connection with Diesel Oxidation Catalysts D and E show that for a SCR catalyst aged downstream of a DOC having a 2:1 Pt:Pd weight ratio overall, the loss of $NO_x$ conversion activity is relatively slight at 67% $NO_x$ conversion activity compared with the control at 72% NO$_x$ conversion activity (a SCR catalyst aged behind a 1:1 Pt:Pd weight ratio overall DOC (not described herein) using the same protocol had a NO$_x$ conversion activity of 69%). However, when the overall Pt:Pd weight ratio was increased to 4:1, SCR activity was significantly reduced to 48%.

The inventors conclude, therefore, that there exists a boundary at about 2:1 Pt:Pd weight ratio overall above which Pt volatilisation is more likely to occur. Hence, by limiting to an overall Pt:Pd weight ratio of 2:1 in the DOC as a whole, and to ≤2:1 Pt:Pd weight ratio in the second washcoat coating layer, Pt in the DOC is less likely to volatilise and migrate to a downstream SCR catalyst.

For the avoidance of any doubt, the entire contents of any and all document cited herein is incorporated by reference into the present application.

The invention claimed is:

1. A catalysed substrate monolith for treating exhaust gas emitted from a lean-burn internal combustion engine comprising an oxidising catalyst on a substrate monolith, wherein the catalysed substrate monolith comprises a first washcoat coating having a length L and a second washcoat coating, wherein the second washcoat coating is disposed in a layer above the first washcoat coating for at least some of length L, wherein the first washcoat coating comprises a catalyst composition comprising platinum (Pt) and at least one support material for the platinum, wherein the second washcoat coating comprises a catalyst composition comprising both platinum (Pt) and palladium (Pd) and at least one support material for the platinum and the palladium and wherein a weight ratio of platinum (Pt) to palladium (Pd) in the second washcoat coating is ≤2.

2. The catalysed substrate monolith according to claim 1, wherein the substrate monolith is a flow-through substrate monolith.

3. The catalysed substrate monolith according to claim 1, wherein the weight ratio of platinum (Pt) to palladium (Pd) in the second washcoat coating is ≤1:1.

4. The catalysed substrate monolith according to claim 1, wherein the second washcoat coating comprises both platinum (Pt) and palladium (Pd) and wherein the first washcoat coating comprises both platinum (Pt) and palladium (Pd) at a higher Pt:Pd weight ratio than in the second washcoat coating.

5. The catalysed substrate monolith according to claim 1, wherein a Pt:Pd weight ratio of both the first washcoat coating and the second washcoat coating combined is ≤1:1.

6. The catalysed substrate monolith according to claim 1, wherein a Pt:Pd weight ratio of both the first washcoat coating and the second washcoat coating combined is ≤10:1.

7. The catalysed substrate monolith according to claim 1, wherein the first washcoat coating comprises 25-75% by weight of the total platinum group metal present in the first washcoat coating and the second washcoat coating combined.

8. The catalysed substrate monolith according to claim 1, wherein the at least one support material of the first washcoat coating or the second washcoat coating comprises a metal oxide selected from the group consisting of optionally stabilised alumina, amorphous silica-alumina, optionally stabilised zirconia, ceria, titania, an optionally stabilised ceria-zirconia mixed oxide, a molecular sieve, and a mixture of any two or more thereof.

9. The catalysed substrate monolith according to claim 1, wherein the oxidising catalyst is a diesel oxidation catalyst or a NO$_x$ adsorber catalyst.

10. The catalysed substrate monolith according to claim 1, wherein a Pt:Pd weight ratio of both the first washcoat coating and the second washcoat coating combined is ≤2:1.

11. An exhaust system for a lean-burn internal combustion engine, which system comprises a first catalysed substrate monolith according to claim 1.

12. The exhaust system according to claim 11, comprising a second catalysed substrate monolith comprising a selective catalytic reduction (SCR) catalyst, which second catalysed substrate monolith being disposed downstream from the first catalysed substrate monolith.

13. The exhaust system according to claim 12 comprising an injector for injecting a nitrogenous reductant into exhaust gas between the first catalysed substrate monolith and the second catalysed substrate monolith.

14. The exhaust system according to claim 12 comprising a third catalysed substrate monolith, wherein the substrate monolith of the first catalysed substrate monolith is a flow-through substrate monolith, wherein the third catalysed substrate monolith is a filtering substrate monolith having inlet surfaces and outlet surfaces and wherein the inlet surfaces are separated from the outlet surfaces by a porous structure, which third catalysed substrate monolith comprises an oxidation catalyst and is disposed between the first catalysed substrate monolith and the second catalysed substrate monolith.

15. The exhaust system according to claim 14 comprising an injector for injecting a nitrogenous reductant into exhaust gas between the first catalysed substrate monolith and the second catalysed substrate monolith, wherein the injector for injecting a nitrogenous reductant into exhaust gas is disposed to inject nitrogenous reductant into exhaust gas between the third catalysed substrate monolith and the second catalysed substrate monolith.

16. The exhaust system according to claim 12 comprising a third substrate monolith, wherein the third substrate monolith is a filtering substrate monolith having inlet surfaces and outlet surfaces, wherein the inlet surfaces are separated from the outlet surfaces by a porous structure, which third substrate monolith is disposed downstream of the second catalysed substrate monolith.

17. The exhaust system according to claim 16, wherein the third substrate monolith comprises an oxidation catalyst.

18. The exhaust system according to claim 12, wherein the second catalysed substrate monolith is a filtering substrate monolith having inlet surfaces and outlet surfaces, wherein the inlet surfaces are separated from the outlet surfaces by a porous structure.

19. The exhaust system according to claim 18, wherein the filtering substrate monolith is a wall-flow filter.

20. A lean-burn internal combustion engine, comprising an exhaust system according to claim 11.

21. A method of reducing or preventing a selective catalytic reduction (SCR) catalyst in an exhaust system of a lean-burn internal combustion engine from becoming poisoned with platinum which may volatilise from a first washcoat coating having a length L comprising a catalyst composition comprising platinum (Pt) and at least one support material for the platinum disposed on a substrate monolith upstream of the SCR catalyst when the catalyst composition comprising platinum is exposed to relatively extreme conditions including relatively high temperatures, which method comprising trapping volatilised platinum in a second washcoat coating disposed in a layer above the first washcoat coating for at least some of the length L, which second washcoat coating comprising a catalyst composition comprising both platinum (Pt) and palladium (Pd) and at least one support material for the platinum and the palladium and wherein a weight ratio of platinum to palladium in the second washcoat coating is ≤2.

* * * * *